United States Patent
Um et al.

(10) Patent No.: US 11,510,214 B2
(45) Date of Patent: Nov. 22, 2022

(54) METHOD AND APPARATUS FOR GENERATING SHARED INFORMATION FOR JOINT USE OF FREQUENCIES BETWEEN RADIO STATIONS

(71) Applicant: Electronics and Telecommunications Research Institute, Daejeon (KR)

(72) Inventors: Jung Sun Um, Daejeon (KR); Bong-Su Kim, Daejeon (KR); Igor Kim, Daejeon (KR); Seung Keun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 62 days.

(21) Appl. No.: 17/186,245

(22) Filed: Feb. 26, 2021

(65) Prior Publication Data

US 2021/0274509 A1    Sep. 2, 2021

(30) Foreign Application Priority Data

Mar. 2, 2020 (KR) .................. 10-2020-0026243
Feb. 10, 2021 (KR) .................. 10-2021-0019208

(51) Int. Cl.
*H04W 72/08* (2009.01)
*H04W 52/24* (2009.01)

(52) U.S. Cl.
CPC ....... *H04W 72/082* (2013.01); *H04W 52/243* (2013.01)

(58) Field of Classification Search
CPC .................. H04W 72/082; H04W 52/243
See application file for complete search history.

(56) References Cited

U.S. PATENT DOCUMENTS

| | | | |
|---|---|---|---|
| 8,700,078 B2 | 4/2014 | Harada et al. | |
| 8,903,404 B2 | 12/2014 | Fujii et al. | |
| 9,320,043 B2 | 4/2016 | Lee et al. | |
| 9,668,088 B2 | 5/2017 | Quinn et al. | |
| 10,244,436 B2 | 3/2019 | Kim | |
| 2020/0068500 A1* | 2/2020 | Liu | H04W 52/146 |
| 2020/0374205 A1* | 11/2020 | Sharma | H04L 67/12 |

FOREIGN PATENT DOCUMENTS

| | | |
|---|---|---|
| JP | 2009-212920 A | 9/2009 |
| KR | 10-2009-0113987 A | 11/2009 |
| KR | 10-2014-0079581 A | 6/2014 |
| KR | 10-2015-0100095 A | 9/2015 |
| KR | 10-2017-0016141 A | 2/2017 |
| KR | 10-2017-0105781 A | 9/2017 |

* cited by examiner

*Primary Examiner* — Hassan A Phillips
*Assistant Examiner* — Prenell P Jones
(74) *Attorney, Agent, or Firm* — NSIP Law

(57) ABSTRACT

A method of generating shared information includes determining an attenuation effect on transmission power of a new radio station due to a reception mask of an existing radio station, calculating an interference effect of the existing radio station due to the new radio station using the attenuation effect, determining a protection domain of the existing radio station according to the interference effect, and generating shared information to be used by the new radio station based on the protection domain, wherein the protection domain is a domain in which a frequency available to the new radio station is restricted.

15 Claims, 37 Drawing Sheets

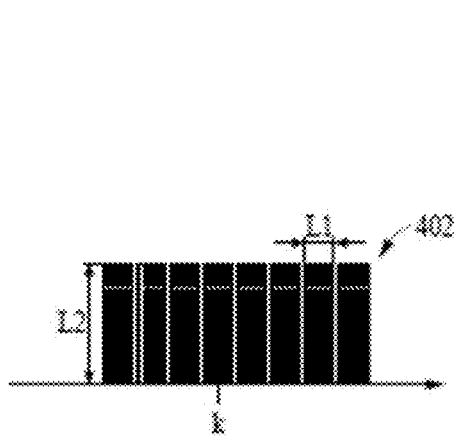
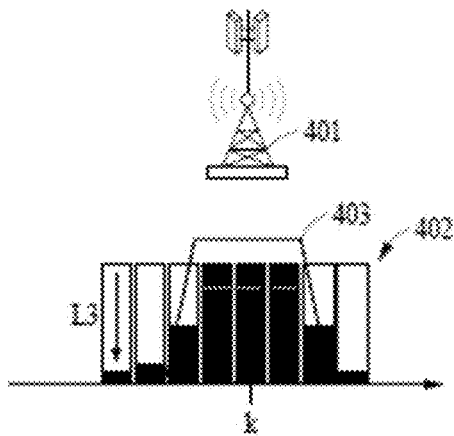
FIG. 4A          FIG. 4B
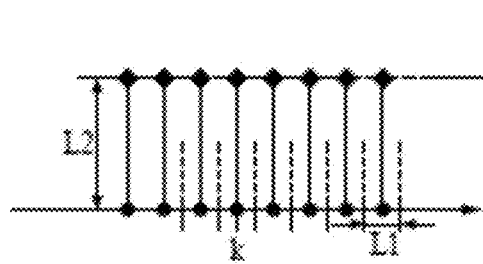
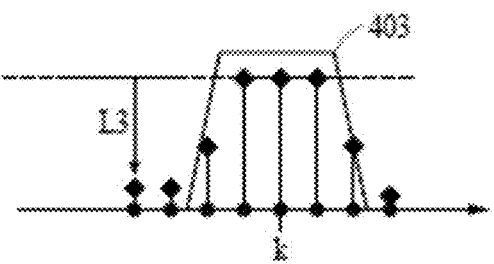
FIG. 4C          FIG. 4D

| -30 | -30 | -29 | -28 | -25 | -25 | -25 | -26 | -27 | -28 | -28 | -28 |
|-----|-----|-----|-----|-----|-----|-----|-----|-----|-----|-----|-----|
| -29 | -29 | -28 | -27 | -24 | -24 | -24 | -25 | -26 | -27 | -27 | -27 |
| -24 | -24 | -23 | -22 | -19 | -19 | -19 | -20 | -21 | -22 | -22 | -22 |
| -12 | -10 | -8  | -7  | -8  | -10 | -11 | -12 | -13 | -13 | -15 | -16 |
| -11 | -9  | 0   | 0   | 4   | 6   | 0   | -10 | -12 | -15 | -18 | -20 |
| -11 | -9  | 0   | 0   | 5   | 8   | 10  | 5   | 0   | -5  | -11 | -14 |
| -12 | -11 | -10 | -3  | 4   | 6   | 0   | -10 | -12 | -15 | -18 | -20 |
| -15 | -12 | -14 | -15 | -15 | -17 | -20 | -25 | -25 | -30 | -31 | -31 |

1401 points to row 4 (starting at -10); 1402 points to row 6 (starting at -11).

FIG. 14

| -30 | -30 | -29 | -28 | -25 | -25 | -25 | -26 | -27 | -28 | -28 | -28 |
|---|---|---|---|---|---|---|---|---|---|---|---|
| -29 | -29 | -28 | -27 | -24 | -24 | -24 | -25 | -26 | -27 | -27 | -27 |
| -24 | -24 | -23 | -22 | -19 | -19 | -19 | -20 | -21 | -22 | -22 | -22 |
| -12 | -10 | -8 | -7 | -8 | -10 | -11 | -12 | -13 | -13 | -15 | -16 |
| -11 | -9 | 0 | 0 | 4 | 6 | 0 | -10 | -12 | -15 | -18 | -20 |
| -11 | -9 | 0 | 0 | 5 | 8 | 10 | 5 | 0 | -5 | -11 | -14 |
| -12 | -11 | -10 | -3 | 4 | 6 | 0 | -10 | -12 | -15 | -18 | -20 |
| -15 | -12 | -14 | -15 | -15 | -17 | -20 | -25 | -25 | -30 | -31 | -31 |

⬇

| -30 | -30 | -29 | -28 | -25 | -25 | -25 | -26 | -27 | -28 | -28 | -28 |
|---|---|---|---|---|---|---|---|---|---|---|---|
| -29 | -29 | -28 | -27 | -24 | -24 | -24 | -25 | -26 | -27 | -27 | -27 |
| -24 | -24 | -23 | -22 | -19 | -19 | -19 | -20 | -21 | -22 | -22 | -22 |
| -12 | -10 | -8 | -7 | -8 | -10 | -11 | -12 | -13 | -13 | -15 | -16 |
| -11 | -9 | 0 | 0 | 4 | 6 | 0 | -10 | -12 | -15 | -18 | -20 |
| -11 | -9 | 0 | 0 | 5 | 8 | 10 | 5 | 0 | -5 | -11 | -14 |
| -12 | -11 | -10 | -3 | 4 | 6 | 0 | -10 | -12 | -15 | -18 | -20 |
| -15 | -12 | -14 | -15 | -15 | -17 | -20 | -25 | -25 | -30 | -31 | -31 |

FIG. 17

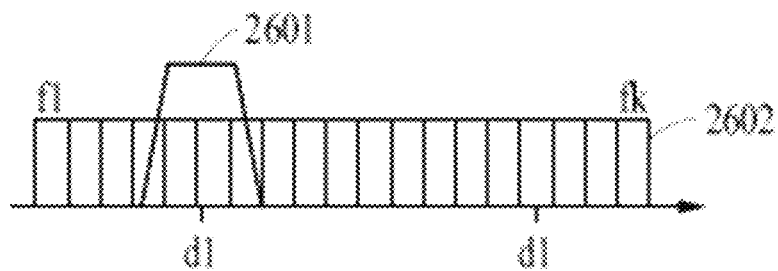
FIG. 26A
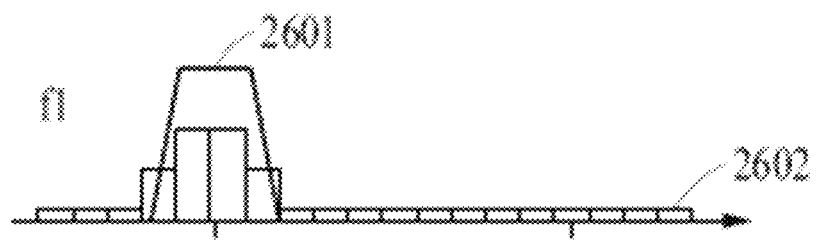
FIG. 26B
| | Unit reference bandwidth frequency | | | | | | | | |
|---|---|---|---|---|---|---|---|---|---|
| | f1 | --- | --- | --- | --- | --- | --- | --- | fk |
| P1 | | | | | | | | | |
| P2 | | | | | | | | | |
| ... | | | | | | | | | |
| PM | | | | | | | | | |
FIG. 26C

| | Interference effect per unit domain (I/N) | | | | | | | | | |
|---|---|---|---|---|---|---|---|---|---|---|
| | P1 | | | | | | | | | P40 |
| Interference effect | | | | | | | | | | |

FIG. 29

METHOD AND APPARATUS FOR GENERATING SHARED INFORMATION FOR JOINT USE OF FREQUENCIES BETWEEN RADIO STATIONS

CROSS-REFERENCE TO RELATED APPLICATION(S)

This application claims the benefit of Korean Patent Application No. 10-2020-0026243, filed on Mar. 2, 2020, and Korean Patent Application No. 10-2021-0019208 filed on Feb. 10, 2021, in the Korean Intellectual Property Office, the entire disclosures of which are incorporated herein by reference for all purposes.

BACKGROUND

1. Field of the Invention

One or more example embodiments relate to an apparatus and method for generating shared information for joint use of frequencies between radio stations and, more specifically, to technology for analyzing an interference effect on an existing radio station due to a new radio station and determining a protection domain of the existing radio station based on the interference effect, thereby generating shared information for joint use of frequencies between radio stations.

2. Description of the Related Art

Technology for joint use of frequencies may indicate that different radio stations, services, or systems jointly use limited resources in one or more domains among temporal, spatial, frequency, and signal level domains.

For example, an ultra-high frequency (UHF) television (TV) broadcast bandwidth of 479 megahertz (MHz) to 698 MHz may be provided for a broadcast service as a primary service and may be provided by a radio station such as a broadcast station. A band of 3.55 gigahertz (GHz) to 3.7 GHz may be used for radar systems.

Recently, research has been conducted for joint use of frequencies between radio stations in a band of 5925 MHz to 7125 MHz. A 6 GHz band is used worldwide for primary services such as fixed communication, fixed broadcast relay, and fixed satellite uplink, and is also used for a mobile broadcast relay service in some countries.

However, recently, as unlicensed wireless communications such as wireless fidelity (Wi-Fi), long term evolution (LTE)-license assisted access (LAA), and fifth generation (5G) new radio unlicensed band (NR-U) are significantly increasing, research for minimizing an interference effect that occurs in a radio station receiving a primary service is required.

Unlike existing radio stations, in a radio local area network (RLAN) such as Wi-Fi, LTE-LAA, and 5G NR-U, a location of a communication terminal such as a smartphone or a personal computer (PC) may be continuously changed rather than being fixed, so dynamic calculation for an interference effect is required. Also, to protect a radio station receiving a primary service, technology for determining shared information associated with a frequency, a channel, and transmission power that can be used by a radio station supporting the RLAN at a specific location is required.

SUMMARY

Example embodiments provide an apparatus and method for calculating an interference effect that may be exerted on an existing radio station that receives a primary service and generating shared information available to a new radio station, thereby protecting an existing radio station that receives an existing service and supporting communication of the new radio station.

According to an aspect, there is provided a method of generating shared information, the method including determining an attenuation effect on transmission power of a new radio station due to a reception mask of an existing radio station, calculating an interference effect of the existing radio station due to the new radio station using the attenuation effect, determining a protection domain of the existing radio station according to the interference effect, and generating shared information to be used by the new radio station based on the protection domain, wherein the protection domain is a domain in which a frequency available to the new radio station is restricted.

The determining of the attenuation effect may include determining an attenuation effect based on at least one of the reception mask of the existing radio station, a transmission mask of the new radio station, a difference between a center frequency of the new radio station and a center frequency of the existing radio station, a bandwidth of the new radio station, and the transmission power of the new radio station.

The determining of the attenuation effect may include determining the attenuation effect by calculating a total attenuation effect per unit reference bandwidth for each frequency.

The calculating of the interference effect may include determining the interference effect based on i) a difference between the transmission power of the new radio station and the attenuation effect and ii) a path loss interference effect according to a distance between a location of the new radio station and the existing radio station.

When the new radio station is a plurality of new radio stations, the calculating of the interference effect may include calculating a total interference effect for each of the new radio stations.

The calculating of the interference effect may include determining the interference effect for each unit domain using the attenuation effect, and the protection domain may include unit domains in which the interference effect is higher than a threshold.

The calculating of the interference effect may include determining an interference effect on the unit domain using one of whether the new radio station is indoor or outdoor, a service domain of the new radio station, and a height of the new radio station.

The determining of the protection domain may include correcting the determined protection domain based on interference effects of the new radio station and other new radio stations.

The shared information may include one of a frequency, a channel, transmission power, and a transmission power density of the new radio station, which are not to cause an interference effect greater than or equal to a threshold to the existing radio station.

According to another aspect, there is also provided a generation apparatus performing a method of generating shared information, the generation apparatus including a processor, wherein the processor is configured to determine an attenuation effect on transmission power of a new radio station due to a reception mask of an existing radio station, calculate an interference effect of the existing radio station due to the new radio station using the attenuation effect, determine a protection domain of the existing radio station according to the interference effect, and generate shared information to be used by the new radio station based on the protection domain, and the protection domain is a domain in which a frequency available to the new radio station is restricted.

The processor may be configured to determine an attenuation effect based on at least one of the reception mask of the existing radio station, a transmission mask of the new radio station, a difference between a center frequency of the new radio station and a center frequency of the existing radio station, a bandwidth of the new radio station, and the transmission power of the new radio station.

The processor may be configured to determine the attenuation effect by calculating a total attenuation effect per unit reference bandwidth for each frequency.

The processor may be configured to determine the interference effect based on i) a difference between the transmission power of the new radio station and the attenuation effect and ii) a path loss interference effect according to a distance between a location of the new radio station and the existing radio station.

When the new radio station is a plurality of new radio stations, the processor may be configured to calculate a total interference effect for each of the new radio stations.

The processor may be configured to determine the interference effect for each unit domain using the attenuation effect, and the protection domain may include unit domains in which the interference effect is higher than a threshold.

The processor may be configured to determine an interference effect on the unit domain using one of whether the new radio station is indoor or outdoor, a service domain of the new radio station, and a height of the new radio station.

The processor may be configured to correct the determined protection domain based on interference effects of the new radio station and other new radio stations.

The shared information may include one of a frequency, a channel, transmission power, and a transmission power density of the new radio station, which are not to cause an interference effect greater than or equal to a threshold to the existing radio station.

Additional aspects of example embodiments will be set forth in part in the description which follows and, in part, will be apparent from the description, or may be learned by practice of the disclosure.

According to example embodiments, it is possible to calculate an interference effect that may be exerted on an existing radio station that receives a primary service and generate shared information available to a new radio station, thereby protecting an existing radio station that receives an existing service and supporting communication of the new radio station.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIGS. 4A-4D are diagrams illustrating examples of an attenuation effect per unit reference bandwidth according to an example embodiment;

FIGS. 7A-7C are diagrams illustrating examples of determining a protection domain based on an indoor and outdoor condition according to an example embodiment;

FIG. 14 is a diagram illustrating an example of a protection domain determined based on a cumulative interference effect according to an example embodiment;

FIG. 17 is a diagram illustrating an example of expanding a protection domain according to an example embodiment;

FIGS. 26A-26E are diagrams illustrating examples of a table showing an attenuation effect and an interference effect according to an example embodiment;

FIG. 29 is a diagram illustrating an example of a table of interference effects per unit domain determined based on different parameters according to an example embodiment.

DETAILED DESCRIPTION

Figure 1:
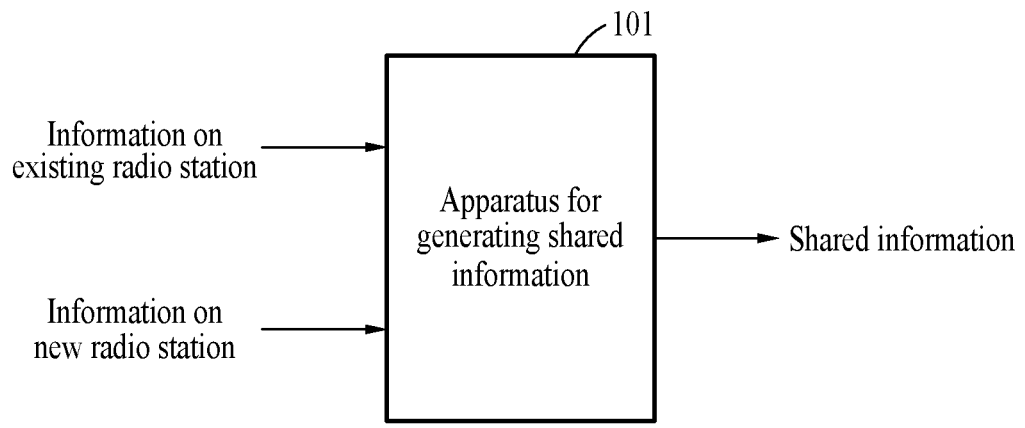
FIG. 1 is a diagram illustrating an apparatus for generating shared information according to an example embodiment.

Hereinafter, example embodiments will be described in detail with reference to the accompanying drawings. It should be understood, however, that there is no intent to limit this disclosure to the particular example embodiments disclosed. On the contrary, example embodiments are to cover all modifications, equivalents, and alternatives falling within the scope of the example embodiments.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

FIG. 1 is a diagram illustrating an apparatus for generating shared information according to an example embodiment.

The present disclosure relates to a technology for analyzing an interference effect of an existing radio station due to a new radio station, determining a protection domain of the existing radio station based on the interference effect, thereby generating shared information for joint use of frequencies between radio stations.

In the present disclosure, a method of generating shared information is performed by an apparatus 101 for generating shared information (hereinafter, also referred to as a "generation apparatus 101"). The generation apparatus 101 may include a processor, may be a separate electronic apparatus 101 that communicates with an existing radio station and a new radio station, and may correspond to an existing radio station or a new radio station.

In the present disclosure, shared information may include i) an available frequency to be used by a new radio station, ii) a channel, and iii) transmission power available to a new radio station. For example, the shared information may indicate a frequency, a channel, transmission power, and a transmission power density available to a new radio station located around one existing radio station that receives a primary service.

The generation apparatus 101 may analyze an interference effect exerted on the existing radio station due to a plurality of new radio stations and determine a protection domain for protecting communication of the existing radio station. The generation apparatus 101 may determine shared information to be used by a new radio station based on the interference effect and the protection domain.

Referring to FIG. 1, the generation apparatus 101 may generate a protection domain and shared information for joint use of frequencies between an existing radio station and a new radio station using information on the existing radio station and information on the new radio station.

The existing radio station may perform communication for supporting a primary service such as fixed communication, fixed broadcast relay, and fixed satellite uplink. The new radio station may perform communication for supporting a secondary service, for example, an unlicensed wireless communication system such as wireless fidelity (Wi-Fi), long term evolution (LTE)-license assisted access (LAA), and fifth generation (5G) new radio unlicensed band (NR-U).

The primary service and the secondary service may have different channel bandwidths and different center frequencies. A channel bandwidth of the secondary service may be a plurality of different values. According to a channel bandwidth, to maintain the same total radiation power intensity, a radiation power intensity per unit bandwidth (e.g., resolution bandwidth) may be set differently.

The information on the existing radio station may include i) a reception mask, ii) a center frequency, iii) a bandwidth, and iv) a channel of the existing radio station. The information on the new radio station may include i) a location, ii) whether the new radio station is indoor or outdoor, iii) transmission power, iv) a transmission mask, v) a bandwidth, vi) a center frequency, vii) a height, and viii) a service domain of the new radio station.

Figure 2:
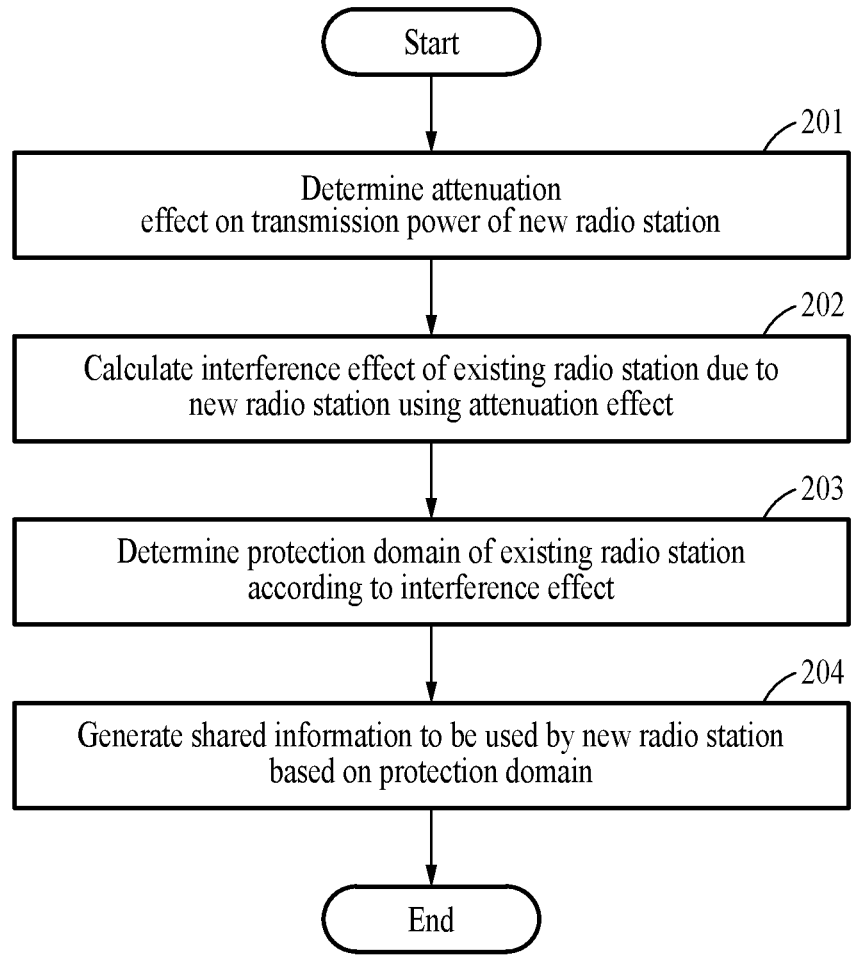
FIG. 2 is a flowchart illustrating a method of generating shared information according to an example embodiment.

FIG. 2 is a flowchart illustrating a method of generating shared information according to an example embodiment.

In operation 201, a generation apparatus may determine an attenuation effect on transmission power of a new radio station due to a reception mask of an existing radio station. The attenuation effect may refer to a degree to which the transmission power of the new radio station is attenuated due to a reception mask of the existing radio station.

The generation apparatus may determine the attenuation effect based on at least one of the reception mask of the existing radio station, a transmission mask of the new radio station, a difference between a center frequency of the new radio station and a center frequency of the existing radio station, a bandwidth of the new radio station, and the transmission power of the new radio station. The generation apparatus may determine the attenuation effect by calculating a total attenuation effect per unit reference bandwidth for each frequency.

In operation 202, the generation apparatus may calculate an interference effect of the existing radio station due to the new radio station using the attenuation effect. The generation apparatus may determine a path loss from a predetermined location of the new radio station to the existing radio station receiving a primary service. In addition, the generation apparatus may calculate the interference effect using at least one of the transmission power of the new radio station, the attenuation effect, and the path loss.

The generation apparatus may determine the attenuation effect by calculating a total attenuation effect per unit reference bandwidth for each frequency. The generation apparatus may determine the interference effect based on i) a difference between the transmission power of the new radio station and the attenuation effect and ii) a path loss interference effect according to a distance between a location of the new radio station and the existing radio station.

When the new radio station is a plurality of new radio stations, the generation apparatus may calculate a total interference effect for each of the new radio stations. The generation apparatus may determine an interference effect on the unit domain using one of whether the new radio station is indoor or outdoor, a service domain of the new radio station, and a height of the new radio station.

In operation 203, the generation apparatus may determine a protection domain of the existing radio station according to the interference effect. The protection domain may be composed of unit domains in which the interference effect is higher than a threshold. The generation apparatus may correct the determined protection domain based on interference effects of the new radio station and other new radio stations.

In operation 204, the generation apparatus may generate shared information to be used by the new radio station based on the protection domain. The shared information may include one of a frequency, a channel, transmission power, and a transmission power density of the new radio station, which may not cause an interference effect greater than or equal to a threshold to the existing radio station.

FIGS. 3A through 3I are diagrams illustrating an example of an attenuation effect and an interference effect according to an example embodiment.

Figure 3A:
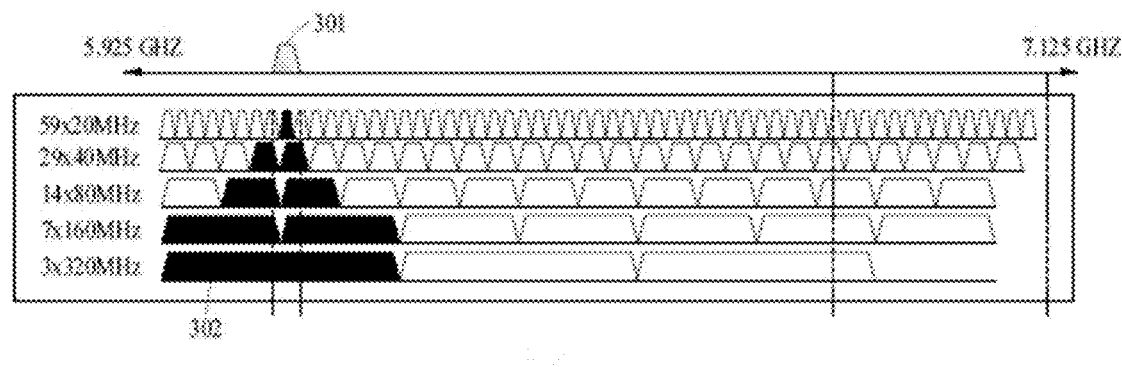
FIGS. 3A-3I are diagrams illustrating examples of an attenuation effect and an interference effect according to an example embodiment.
Figure 3B:
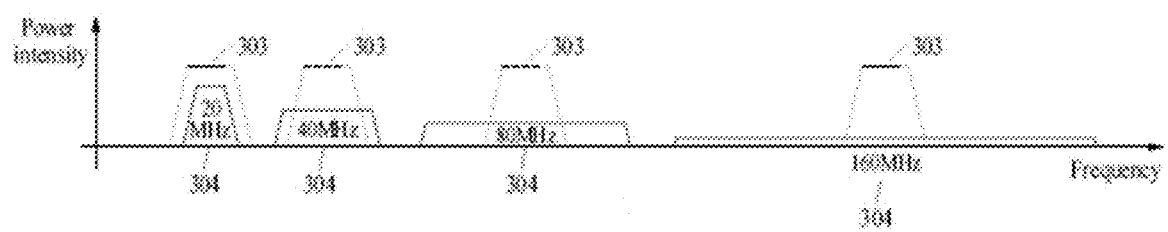
Figure 3C:
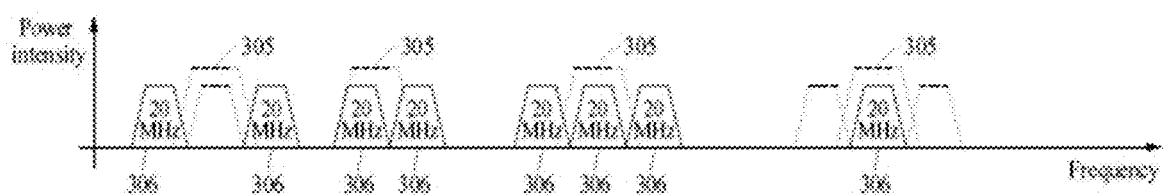

FIG. 3A-3C are diagrams illustrating examples of a channel and a bandwidth of a new radio station exerting an interference effect on an existing radio station according to an example embodiment. A radiation power intensity per unit basic bandwidth may be defined as a power spectral density.

For example, a bandwidth of a channel of a secondary service is X and a maximum radiation power intensity is Y. In this example, when the bandwidth of the channel increases to be doubled, the maximum radiation power intensity may be the same as Y while the power spectral density is reduced by half.

Referring to FIG. 3A, for example, a secondary service may have channel bandwidths of 20, 40, 80, 160, and 320 megahertz (MHz) as shown in FIG. 3A. When the primary service of the existing radio station uses a channel bandwidth 301 of 30 MHz as shown in FIG. 3A, channel bandwidths 302 of the new radio station may interfere with the primary service of the existing radio station.

The interference effect on the existing radio station receiving the primary service may be changed based on the bandwidth of the new radio station. For example, FIG. 3B shows an example of an interference effect according to a relationship between a receiving filter 303 of the existing radio station receiving the primary service and a bandwidth 304 of the new radio station.

When interference occurs due to a single new radio station, as the bandwidth 304 of the new radio station increases, a power density may be reduced, and the interference effect may also decrease. When interference occurs due to the single new radio station, as the bandwidth 304 of the new radio station decreases, the power density may increase, and the interference effect may also increase.

FIG. 3C shows an example of an interference effect that may occur according to a center frequency position of the new radio station when interference occurs due to a plurality of new radio stations. An interference effect occurring due to a single new radio station may be defined as a single interference effect. An interference effect occurring due to a plurality of new radio stations may be defined as a cumulative interference effect.

Referring to FIG. 3C, as a distance between the center frequency position of the new radio station and a position of a frequency of the existing radio station decreases, the interference effect may increase. Also, as the distance increases, the interference effect may be reduced. That is, based on a distribution and an operating situation of the plurality of new radio stations, the interference effect may appear complex.

To calculate the interference effect, the generation apparatus may determine an attenuation effect by a receiving filter of the primary service of the existing radio station and an attenuation effect according to a center frequency difference between the existing radio station and the new radio station. The attenuation effect may refer to a degree to which the transmission power of the new radio station is attenuated due to the reception mask of the existing radio station.

$$MD = 10\log\frac{\int_0^\infty P(f)df}{\int_0^\infty P(f)|H(f)|^2 df} \qquad \text{[Equation 1]}$$

$$NFD(\Delta f) = 10\log\frac{\int_0^\infty P(f)|H(f)|^2 df}{\int_0^\infty P(f)|H(f+\Delta f)|^2 df} \qquad \text{[Equation 2]}$$

In Equation 1, MD stands for masks discrimination, which denotes the attenuation effect by the receiving filter of the existing radio station. Also, NFD stands for net filter discrimination, which denotes the attenuation effect according to the center frequency difference between the existing radio station and the new radio station. For example, when the transmission power of the new radio station 20 decibels (dB), and when the attenuation effect is 10 dB, the existing radio station may receive 10 dB so that interference occurs in the primary service.

P(f) denotes a transmission mask of the new radio station. The transmission mask may refer to a transmission spectrum mask. H(f) denotes a reception mask of the primary service of the existing radio station. The reception mask may refer to a reception selecting mask.

f denotes a frequency. A bandwidth of the transmission spectrum mask may be defined as a bandwidth less than a bandwidth of the receiving filter of the primary service so and used. Δf denotes a difference between the center frequency of the new radio station and the center frequency of the existing radio station.

A method of determining an interference effect according to an existing embodiment may determine the interference effect using MD and NFD. Attenuation effects may be determined based on the frequency and the bandwidth of the receiving filter of the primary service of the existing radio station as shown in Table 1 below.

TABLE 1

|  | Δf = −Z | ... | Δf = −A | Δf = 0 | Δf = A | ... | Δf = Z |
|---|---|---|---|---|---|---|---|
| BW(MHz) = a | D(−Z, a) |  | D(−A, a) | D(0, a) | D(A, a) |  | D(Z, a) |
| . |  |  |  |  |  |  |  |
| . |  |  |  |  |  |  |  |
| . |  |  |  |  |  |  |  |
| BW(MHz) = z | D(−Z, z) |  | D(−A, z) | D(0, z) | D(A, z) |  | D(−Z, z) |

In Table 1, D(Z, a) denotes a sum of MD and NFD of a case in which a difference between the center frequency of the new radio station and the center frequency of the existing radio station is Z and the bandwidth of the new radio station is a. In Table 1, BW(MHz) denotes a bandwidth of a unit of MHz. Δ f denotes a center frequency difference between the new radio station and the existing radio station.

Figure 3D:
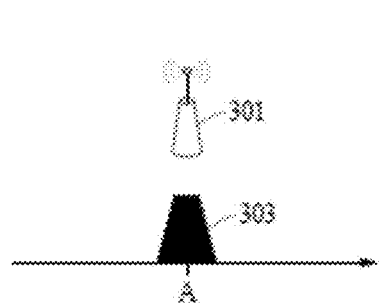
Figure 3E:
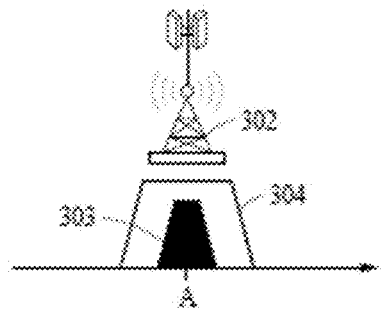
Figure 3F:
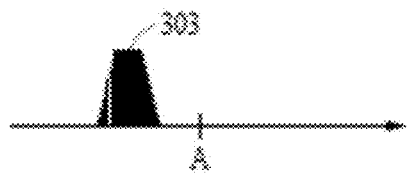
Figure 3G:
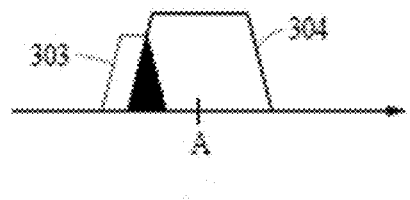
Figure 3H:
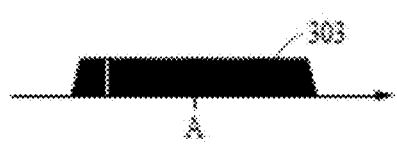
Figure 3I:
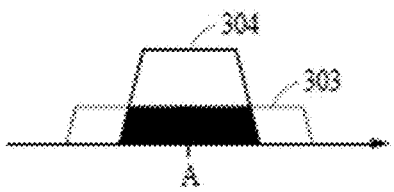

FIG. 3D shows the new radio station 307 and the transmission spectrum mask of the new radio station. FIG. 3E shows a case in which the transmission spectrum mask 309 of the new radio station 307 is included in the reception selecting mask 310 for the primary service of the existing radio station 308. FIG. 3F shows the transmission spectrum mask 309 of the new radio station 307 whose a center frequency is not A. FIG. 3G shows a case in which the center frequency of the new radio station 307 is different from a center frequency for the primary service of the existing radio station 308. FIG. 3H shows the transmission spectrum mask 309 of the new radio station 307 whose bandwidth is larger than the bandwidth in FIG. 3D and FIG. 3H. FIG. 3I shows a case in which the bandwidth of the new radio station 307 is larger than the reception selecting mask 310 for the primary service of the existing radio station 308.

The generation apparatus may determine a path loss from a predetermined location of the new radio station to the existing radio station receiving the primary service. The path loss may refer to an amount of power lost based on a distance between the new radio station and the existing radio station. The generation apparatus may calculate the interference effect using at least one of the transmission power of the new radio station, the attenuation effect, and the path loss.

The path loss may refer to an amount of signal intensity reduced due to a distance between radio stations. The path loss may occur due to reflection, diffraction, scattering, transmission loss, and the like. As an example, the path loss may be determined through a separate measurement performed every execution. As another example, the path loss may be determined through a path loss model defined in the International Telecommunication Union (ITU) radiocommunication sector (ITU-R). A method of determining the path loss is not limited to a specific example, and various methods selected by those skilled in the art may be used.

For example, the single interference effect by the single new radio station may be determined according to Equation 3. A unit of the interference effect may be dB.

$$I(n, p) = X - D(\Delta f, BW) - \text{Pathloss} \quad \text{[Equation 3]}$$

In Equation 3, n denotes an index of the new radio station, p denotes a position of an n-th new radio station, which may be represented by two-dimensional (2D) coordinates. I denotes the interference effect. X denotes transmission power (dBm) of the n-th new radio station, and Pathloss denotes the path loss. Pathloss may be included in a value of X and calculated in advance. D(Δf, BW) denotes the attenuation effect determined in Table 1 above.

The generation apparatus may determine the single interference effect based on the transmission power of the new radio station and a difference between the attenuation effect and the path loss. Also, Equation 4 may be used to determine the cumulative interference effect due to the plurality of new radio stations.

$$I_{Tot} = \sum_{n=1}^{N} I(n, p_n) \quad \text{[Equation 4]}$$

In Equation 4, N denotes the number of new radio stations that may affect the existing radio station. n denotes an index of the new radio station and $p_n$ denotes a position of the n-th new radio station. $I_{Tot}$ denotes the cumulative interference effect due to the plurality of new radio stations. That is, the generation apparatus may determine the cumulative interference effect based on a sum of single interference effects of the plurality of new radio stations.

A method of determining an interference effect according to a new embodiment may determine the interference effect using an attenuation effect determined based on a bandwidth difference and a center frequency difference between the new radio station and the existing radio station, and the bandwidth of the new radio station. The method of determining an interference effect according to a new embodiment may be used in a case in which the bandwidth of the new radio station is higher than a bandwidth of the existing radio station.

For example, the generation apparatus may determine the attenuation effect based on a bandwidth difference and a center frequency difference between the new radio station and the existing radio station, and the bandwidth of the new radio station. An existing reference attenuation may be determined in advance based on the bandwidth of the new radio station. For example, the generation apparatus may determine the existing reference attenuation in proportion to the bandwidth of the new radio station.

The generation apparatus may determine a new reference attenuation based on a bandwidth difference between existing radio stations. For example, the generation apparatus may determine a lower new reference attenuation as the bandwidth difference between the existing radio stations is larger. The generation apparatus may determine the new reference attenuation in inverse proportion to the bandwidth difference between the existing radio stations.

The generation apparatus may determine a third reference attenuation based on a different in center frequency. For example, when a difference in center frequency between the new radio station and the existing radio station ranges from +A to −A, the generation apparatus may determine the third reference attenuation to be M dB.

In addition, when a difference in center frequency between the new radio station and the existing radio station is a value ranging from +A to +B or ranging from −A to −B, the generation apparatus may determine the third reference attenuation to be N dB. In this case, A, B, M, and N may be determined to be a positive real number. Also, B may be greater than A and M may be greater than N. A, B, M, and N may not be limited as being a specific value.

For example, N may be M+D(Δf). D(Δf) may be a sum of the attenuation effect MD by the receiving filter of the existing radio station based on a difference in center frequency between the new radio station and the existing radio station and the attenuation effects NFD according to a center frequency difference between the new radio station and the existing radio station.

When a difference in center frequency between the new radio station and the existing radio station is a value ranging from +A to more than +B or less than −B, the generation apparatus may determine the third reference attenuation to be K dB. K may be a value greater than N and determined in advance.

For example, the generation apparatus may determine the third reference attenuation to be a larger value as the bandwidth of the new radio station increases. For example, when a difference in center frequency between a radio station and the existing radio station ranges between +A and −A, and when the bandwidth of the new radio station is 20 MHz, a new third reference attenuation may be determined to be M dB. When a difference in center frequency between a radio station and the existing radio station ranges between +A and −A, and when the bandwidth of the new radio station is 40 MHz or more, the third reference attenuation may be determined to be 2 M dB instead of M.

The generation apparatus may determine a sum of the existing or third reference attenuation to be an attenuation effect according to a new embodiment. In addition, the generation apparatus may calculate the interference effect using at least one of the transmission power of the new radio station, the attenuation effect, and the path loss.

In a new example embodiment, the single interference effect by the single new radio station may be determined according to Equation 5 below.

$$I(n, p) = X - D2 - \text{Pathloss} \quad \text{[Equation 5]}$$

In Equation 5, n denotes an index of the new radio station and p denotes a position of the n-th new radio station, which may be represented by 2D coordinates. I denotes the interference effect. X denotes transmission power (dBm) of the n-th new radio station and Pathloss denotes the path loss. Pathloss may be included in a value of X and calculated in advance. D2 denotes the attenuation effect determined in the new example embodiment and may be a sum of the existing to third reference attenuations.

As such, the generation apparatus may determine the single interference effect based on the transmission power of the new radio station and a difference between the attenuation effect and the path loss. Also, Equation 4 may be used to determine the cumulative interference effect due to the plurality of new radio stations. The generation apparatus may determine the cumulative interference effect based on a sum of the single interference effects of the plurality of new radio stations.

A method of determining an interference effect according to a third embodiment may determine the interference effect based on a total attenuation effect per unit reference bandwidth. A process of determining the interference effect based on the total attenuation effect per unit reference bandwidth is described with reference to FIG. 4.

FIGS. 4A-4D are diagrams illustrating examples of an attenuation effect per unit reference bandwidth according to an example embodiment.

FIG. 4A shows a bandwidth 402 of a new radio station and shows that a unit reference bandwidth and power per unit reference bandwidth are occupied. A length (e.g., L1 of FIG. 4) of the unit reference bandwidth may be 1 MHz. The length (e.g., L1 of FIG. 4) of the unit reference bandwidth and a magnitude of power (e.g., L2 of FIG. 4) of the unit reference bandwidth are not limited to the example described herein. FIG. 4C shows a bandwidth of a new radio station and shows a unit reference bandwidth and a value of power per unit reference bandwidth.

FIG. 4B shows an example in which unit power of reference bandwidth of a new radio station is attenuated due to a reception mask 403 of an existing radio station 401. FIG. 4D shows an example in which power of a new radio station is attenuated due to the reception mask 403 of the existing radio station 401.

For example, a generation apparatus may classify a bandwidth of the new radio station based on a unit reference bandwidth and calculate an attenuation effect per unit reference bandwidth. The attenuation effect per unit reference bandwidth may be determined in advance based on a transmission mask of the new radio station and the reception mask of the existing radio station. For example, the generation apparatus may segment the unit reference bandwidth and calculate an attenuation effect per segmented unit reference bandwidth.

For example, the generation apparatus may set an attenuation effect for a unit reference bandwidth included in the reception mask of the existing radio station to be N %. In addition, the generation apparatus may set an attenuation effect for a unit reference bandwidth adjacent to a boundary of the reception mask to be M %, M being greater than N. Also, the generation apparatus may set an attenuation effect for a unit reference bandwidth that is not included in the reception mask to be K %. K being greater than M.

For example, an attenuation effect per unit reference bandwidth according to the transmission mask of the new radio station may be determined as a table in advance. Also, an attenuation effect per unit reference bandwidth according to the reception mask of the existing radio station may be determined as a table in advance.

Figure 5A:
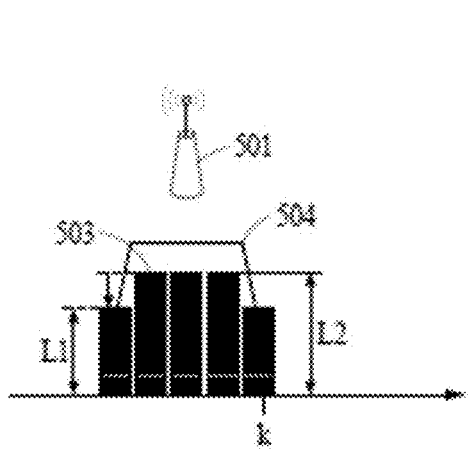
FIGS. 5A-5B are diagrams illustrating examples of a degree of attenuation varying based on a center frequency of a new radio station and a shape of a reception mask of an existing radio station according to an example embodiment.
Figure 5B:
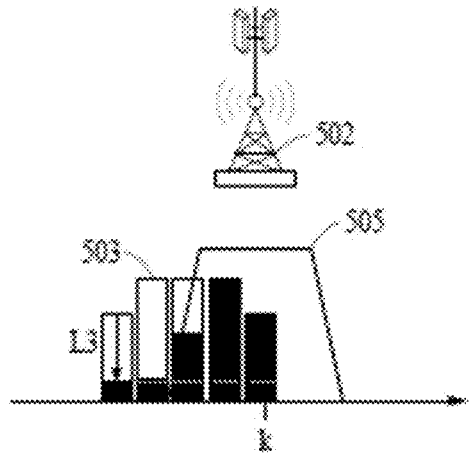

FIGS. 5A-5B are diagrams illustrating examples of a degree of attenuation varying based on a center frequency of a new radio station 501 and a shape of a reception mask 505 of an existing radio station 502 according to an example embodiment.

Referring to FIG. 5A, power may be attenuated by a transmission mask 504 of the new radio station 501. For example, as shown in (a) of FIG. 5, a magnitude of power of a unit reference bandwidth 503 may be reduced from L2 to L1 nu the transmission mask 504 of the new radio station 501.

FIG. 5B shows a case in which attenuation occurs by the reception mask 505 of the existing radio station 502 by a difference between a center frequency of the new radio station 501 and a center frequency k of the existing radio station 502.

For example, when some of the unit reference bandwidths 503 are adjacent to the reception mask 505 of the existing radio station 502, a generation apparatus may determine an attenuation effect by applying attenuation at a preset existing ratio to two unit reference bandwidths 503 adjacent to the reception mask 505 of the existing radio station 502. The existing ratio may be a predetermined positive number.

The attenuation may be applied to the unit reference bandwidth 503 that is beyond a frequency range of the reception mask 505 of the existing radio station 502 at a new ratio greater than the existing ratio, so that the attenuation effect is determined. In addition, the attenuation may not be applied to the unit reference bandwidth 503 that is within the frequency range of the reception mask 505 of the existing radio station 502 and is not adjacent to the reception mask 505.

That is, the generation apparatus may calculate the attenuation effect per unit reference bandwidth 503 by applying the attenuation to the unit reference bandwidth 503 according to the transmission mask 504 of the new radio station 501 and additionally applying the attenuation to the unit reference bandwidth 503 according to the reception mask 505 of the existing radio station 502.

The generation apparatus may determine an interference effect based on the attenuation effects determined for each of the unit reference bandwidths 503 and a path loss. To determine the attenuation effect, transmission power, a bandwidth, and a center frequency of the new radio station 501, and a reception mask and a center frequency of the existing radio station. To determine the interference effect, the transmission power, the attenuation effect, and the path loss.

For example, by using Equation 6, the generation apparatus may determine a single interference effect by a single new radio station according to a third embodiment.

$$I(n, p) = \Sum_{m=1}^{M} I_{m,n,p} - \text{Pathloss} \quad \text{[Equation 6]}$$

In Equation 6, n denotes an index of the new radio station 501 and p denotes a position of the n-th new radio station 501, which may be represented by 2D coordinates. $I_{m,n,p}$ denotes an interference effect of the m-th unit reference bandwidth 503 for the n-th new radio station 501. M denotes the number of the unit reference bandwidths 503. Pathloss denotes a path loss. Pathloss may be included in a value of X and calculated in advance.

In addition, Equation 4 may be used to determine a cumulative interference effect due to a plurality of new radio stations. The generation apparatus may determine the cumulative interference effect based on a sum of single interference effects of the plurality of new radio stations. An order of calculation may be changed in the methods of determining the interference effect according to the existing to third example embodiments, and combinations thereof are also possible.

Figure 6A:
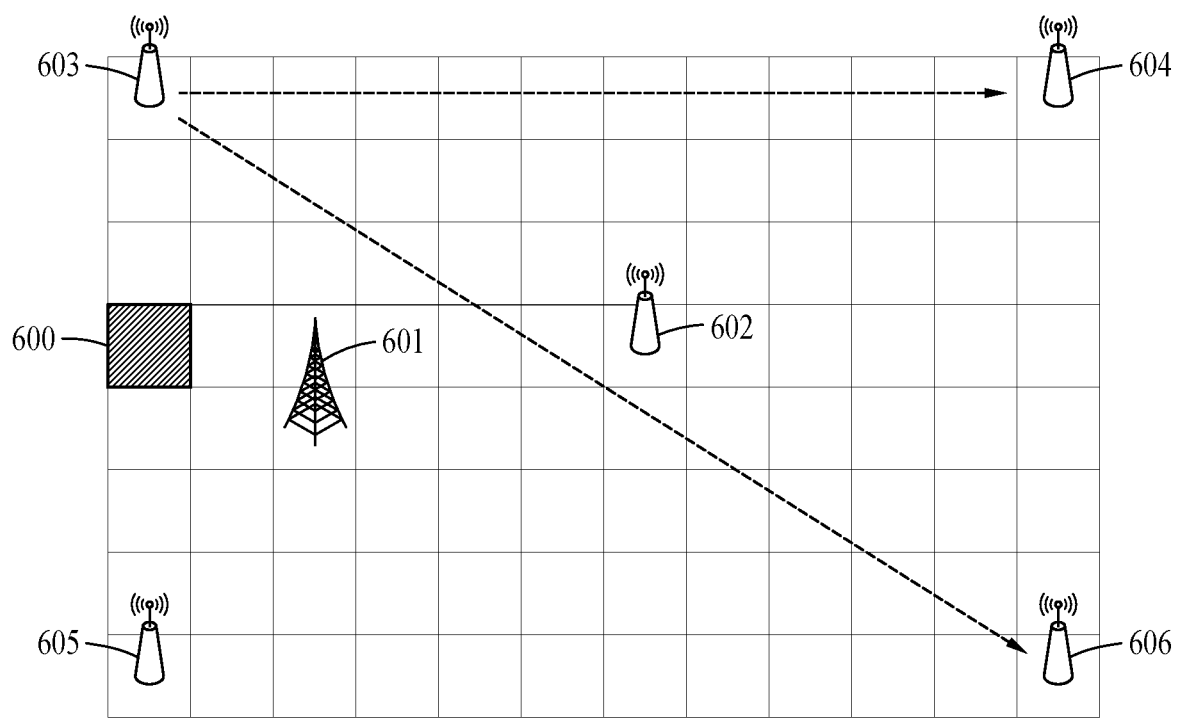
FIGS. 6A through 6C are diagrams illustrating an existing radio station, a new radio station, and a protection domain in a two-dimensional (2D) space according to an example embodiment.

FIG. 6A is a diagram illustrating an example in which an existing radio station and a plurality of new radio stations are arranged according to an example embodiment.

For joint use of frequencies, to prevent an occurrence of an interference effect due to new radio stations 602 through 606, determination of a channel and a frequency unavailable to the new radio stations 602 through 606 adjacent to a location of the existing radio station 601 may be required.

A protection domain is a domain for protecting the existing radio station 601 and may refer to a domain in which an interference effect corresponding to at least a predetermined criterion is to be exerted on the existing radio station when the new radio stations 602 through 606 exist. The protection domain may vary based on an antenna pattern, an antenna ground height, an antenna elevation height, an antenna orientation angle, and an antenna gain of the existing radio station 601 receiving a primary service.

In addition, the protection domain may be changed based on, for example, an operation parameter of a wireless device communicating with the new radio stations 602 through 606 and a location (e.g., indoor or outdoor) of the wireless device.

The protection domain may be changed based on a degree of the interference effect radiated from the new radio stations 602 through 606 and exerted on the primary service. Also, the protection domain may be changed based on topologies, surrounding environments, and surrounding buildings of the new radio stations 602 through 606 and the existing radio station 601. The below-described method of determining the protection domain may vary based on the aforementioned various conditions, but will be briefly described with the conditions below.

The protection domain may be determined based on information on information on the existing radio station 601 and information on the primary service irrespective of an actual operating situation of the new radio stations 602 through 606. In addition, the protection domain may be differently determined based on an operating situation of the new radio stations 602 through 606. The generation apparatus may dynamically determine the protection domain based on the information on the existing radio station 601, the information on the primary service, and information on the new radio stations 602 through 606.

Specifically, when a new radio station is located for each unit domain in consideration of a positional relationship with the new radio stations 602 through 606 based on the existing radio station 601, the generation apparatus may determine a single interference effect that may occur in the existing radio station 601. When the single interference effect is greater than or equal to a threshold, the generation apparatus may determine the unit domain to be a protection domain.

For example, in terms of a predetermined position, although a single interference effect for the existing radio station 601 is absent, due to a relationship with the new radio stations 602 through 606 nearby, a cumulative interference effect for the existing radio station 601 may occur. Thus, the cumulative interference effect may be used to determine the protection domain.

Referring to FIG. 6A, the plurality of new radio stations 602 through 606 may be located to be adjacent to the existing radio station 601. FIG. 6A shows the existing radio station 601 and the new radio stations 602 through 606 in a 2D space.

In FIG. 6A, the 2D space may be divided into unit domains including a unit domain 600. For example, each of the new radio stations 602 through 606 may occupy one unit domain 600. The generation apparatus may calculate a single interference effect on the existing radio station 601 for each unit domain 600.

Figure 6B:
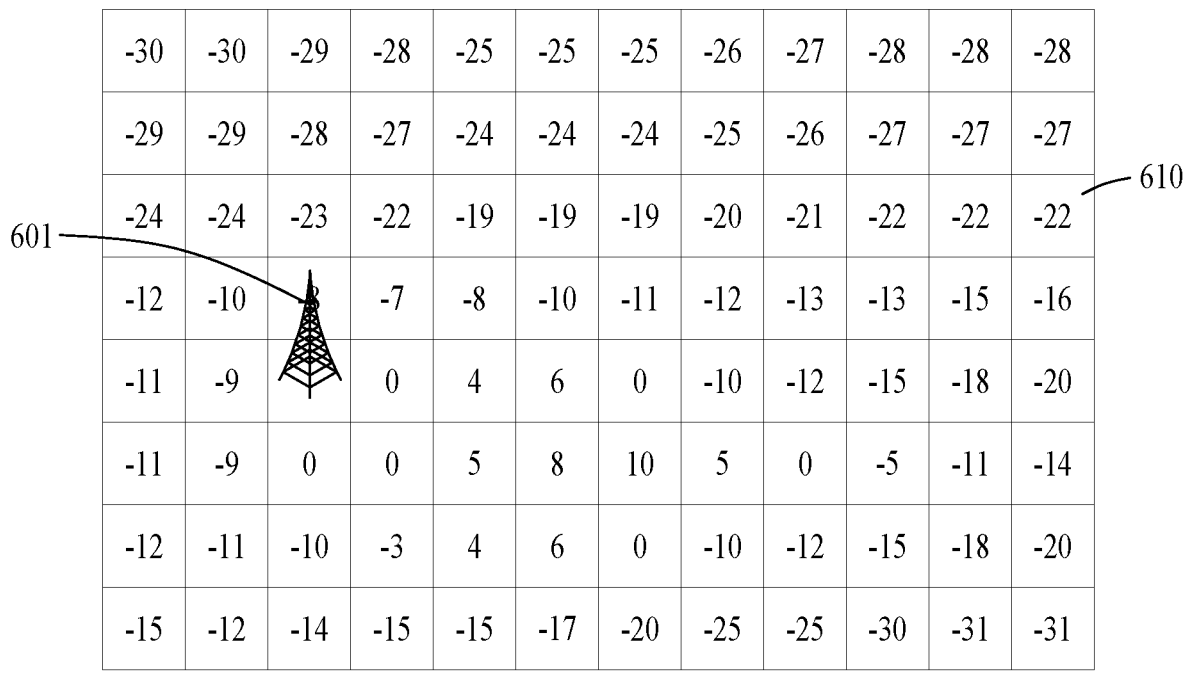

FIG. 6B is a diagram illustrating an example in which an interference effect is determined for each unit domain 600 according to an example embodiment. For example, the interference effect for each unit domain 600 may refer to a single interference effect to be exerted on the existing radio station 601 when a new radio station is located in the unit domain 600. For example, the generation apparatus may determine a single interference effect by adding up single interference effects determined based on a path loss and attenuation effects determined for each unit reference bandwidth.

Figure 6C:
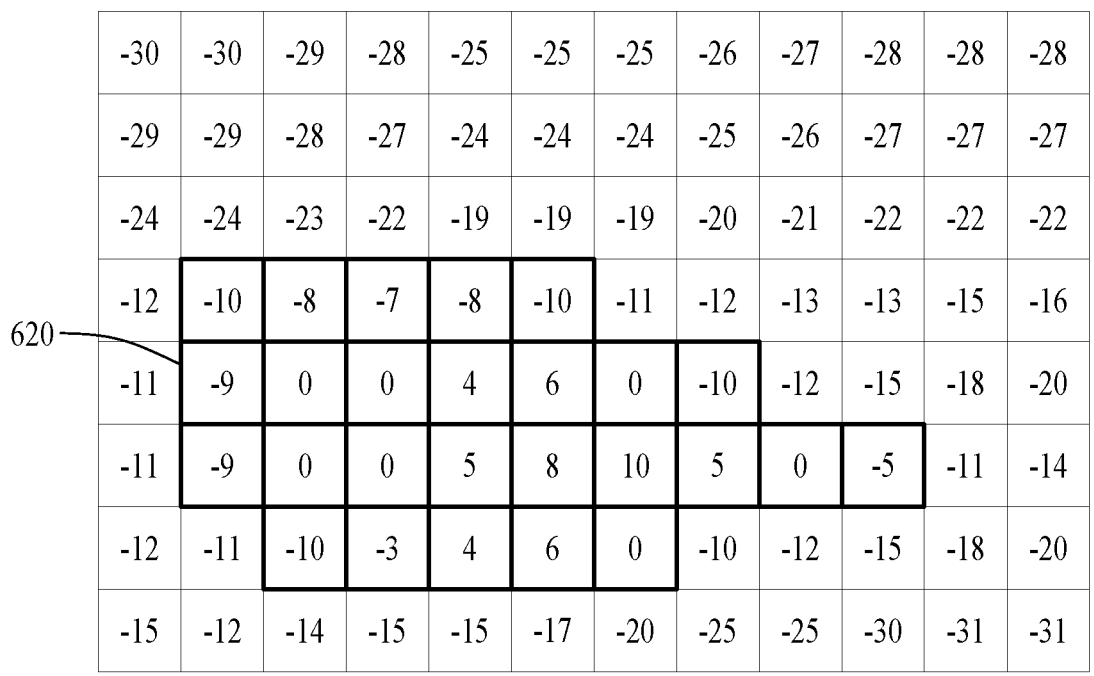

FIG. 6C is a diagram illustrating an example of a protection domain 620 determined based on the interference effect for each unit domain 600 according to an example embodiment. The protection domain 620 of FIG. 6C may be composed of the unit domains 600 in which the single interference effect is greater than a threshold (e.g., −10 dB).

When a single interference effect of a unit domain is greater than the threshold, the unit domain may be determined to be the protection domain 620.

Figures 7A, 7B:
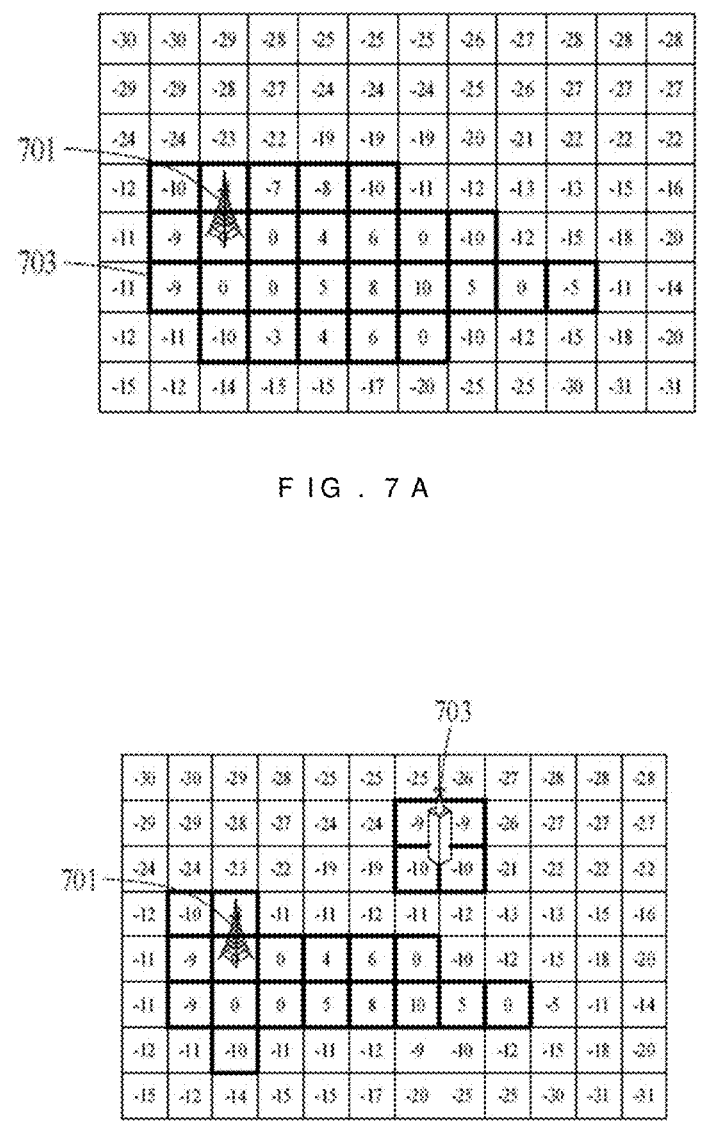
Figure 7C:
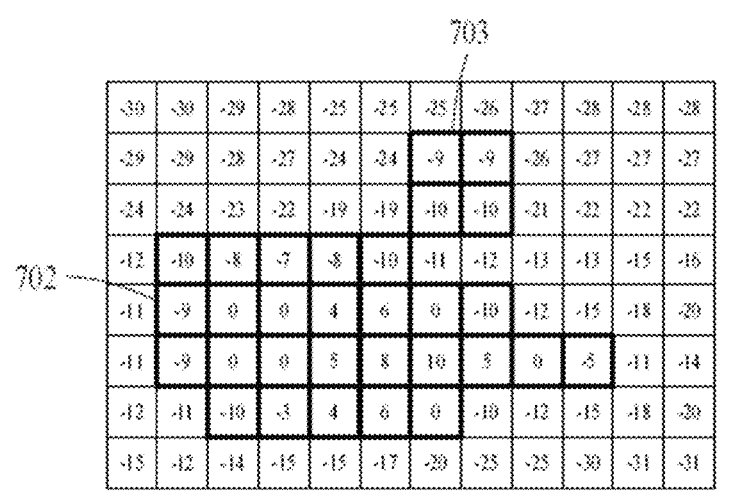

FIG. 7A-7C are diagrams illustrating examples of determining a protection domain based on an indoor and outdoor condition according to an example embodiment.

A protection domain may be differently determined based on an operational characteristic of a new radio station or whether a new radio station is indoor or outdoor. According to an example embodiment, a generation apparatus may determine a protection domain using at least one of a bandwidth, a location, transmission power, a transmission mask, and a center frequency of the new radio station, and a reception mask and a center frequency of an existing radio station 701.

According to another example embodiment, the generation apparatus may dynamically determine protection domains 702 and 703 by considering a bandwidth, transmission power, a transmission mask, a center frequency, an operational characteristic, whether being located indoors or outdoors, and a spatial position of the new radio station, and a transmission mask and a center frequency of the existing radio station 701.

According to an example embodiment, the generation apparatus may collectively determine that the new radio station is located outdoors and determine the protection domain 702 of the existing radio stations 701. According to an example embodiment, when the new radio station is located outdoors, the generation apparatus may determine as being located at a maximum height of a building and determine the protection domain 703 of the existing radio stations 701.

Because the interference effect may be reduced as an indoor height decreases, being located at the maximum height of the building may be the worst case in a unit domain. As another example, when the new radio station is located indoors, the generation apparatus may determine as being located at an intermediate value or statistical value of the building's height and determine a protection domain.

FIG. 7A shows the protection domain 702 determined on the premise that the new radio station is located outdoors collectively. FIG. 7B shows the protection domain 703 determined on the premise that the new radio station is located at the maximum height of the building when the new radio station is located indoors. FIG. 7C shows the protection domains 702 and 703 determined by considering all the protection domain 702 determined in FIG. 7A and the protection domain 703 determined in FIG. 7B.

For each unit domain, the generation apparatus may determine, to be an interference effect of the corresponding unit domain, a larger value between an interference effect calculated on the premise that the new radio station is located outdoors collectively and an interference effect calculated on the premise that the new radio station is located at the maximum height of the building. The generation apparatus may determine the protection domains 702 and 703 by comparing the determined interference effect to a threshold.

Figure 8:
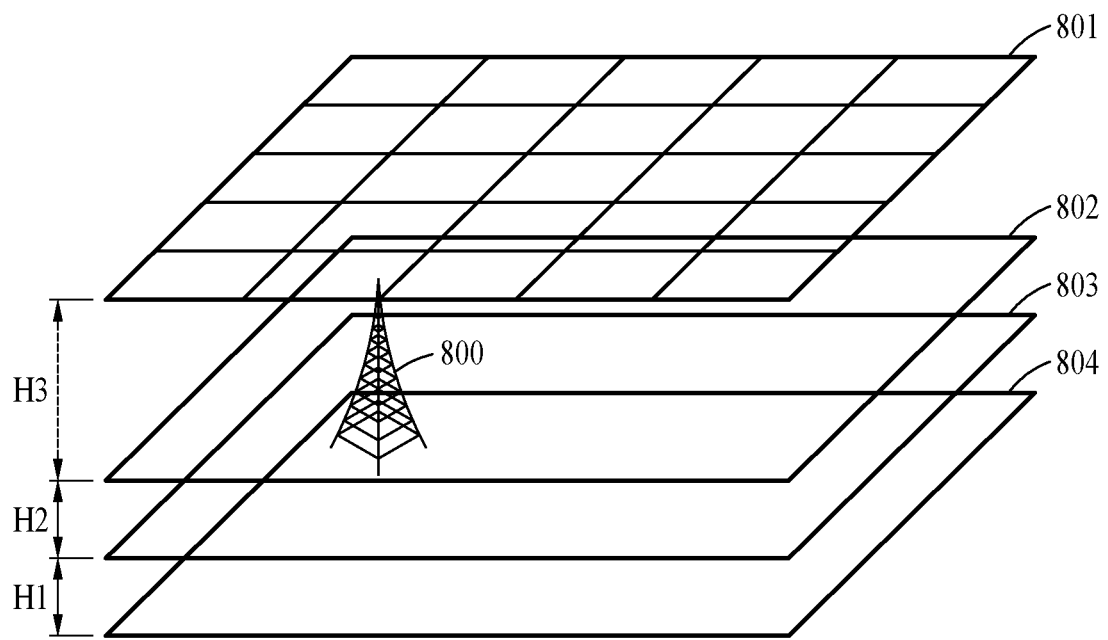
FIG. 8 illustrates an example for calculating an interference effect based on a unit height for each unit domain according to an example embodiment.

FIG. 8 illustrates an example for calculating an interference effect based on a unit height for each unit domain according to an example embodiment.

To calculate an interference effect according to a unit height for each unit domain, unit heights H1 and H2 may be defined. The generation apparatus may calculate an interference effect to be exerted on an existing radio station 800 at each of unit heights 801 through 804 for each unit domain.

The generation apparatus may calculate an interference effect at each of the unit heights 801 through 804 for each unit domain on the premise that a new radio station is located outdoors. Also, when the new radio station is located indoors, the generation apparatus may correct the determined interference effect in consideration of an outdoor transmission loss.

Figure 9:
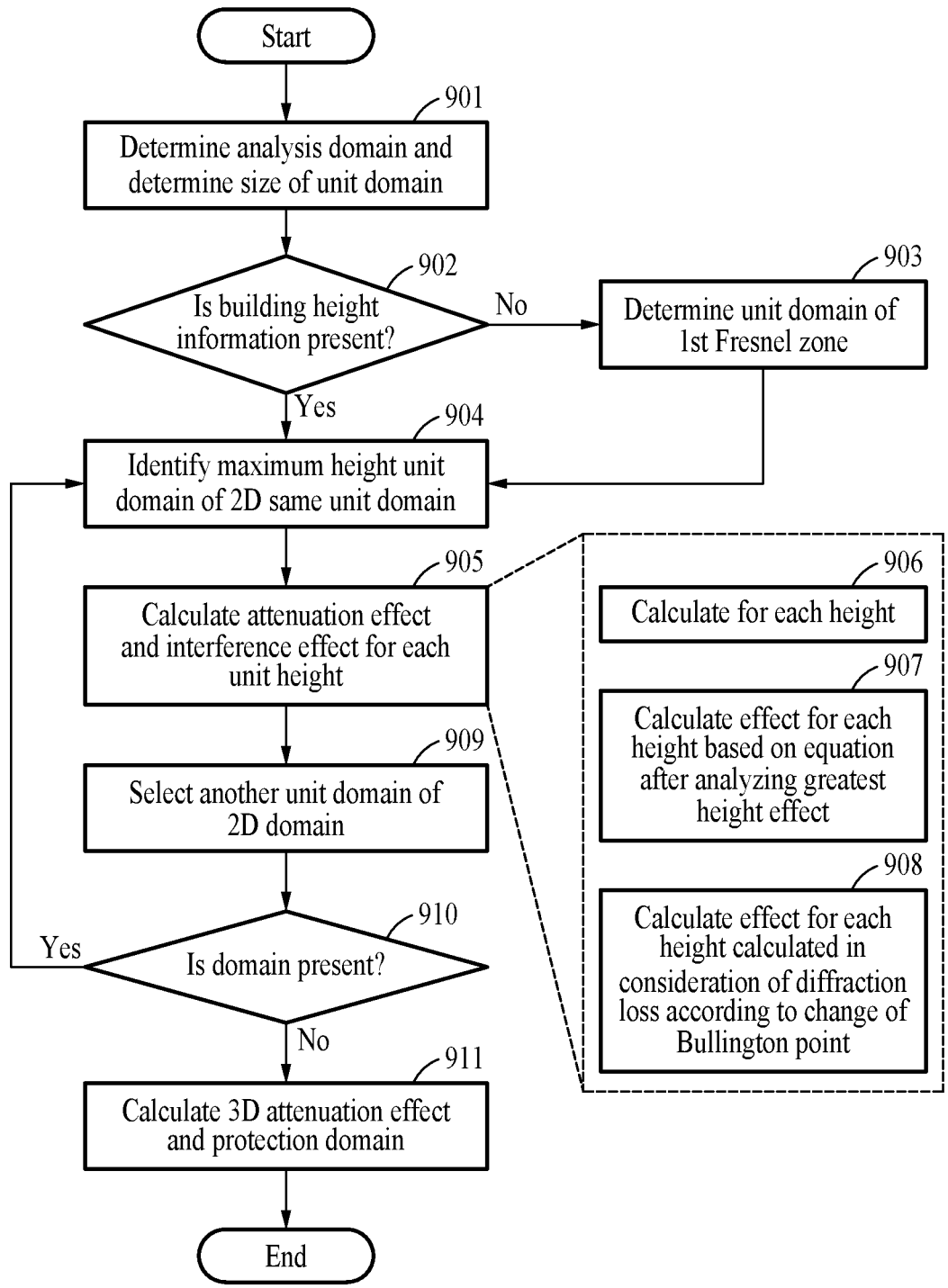
FIG. 9 is a flowchart illustrating a method of determining an interference effect based on a unit height for each unit domain according to an example embodiment.

FIG. 9 is a flowchart illustrating a method of determining an interference effect based on a unit height for each unit domain according to an example embodiment.

In operation 901 of determining an analysis domain and determining a unit domain size, a generation apparatus may determine a size of a unit domain and determine an analysis domain (e.g., the entire grid including unit domains shown in FIGS. 6A through 6C) including a plurality of unit domains. In building height information presence operation 902, the generation apparatus may determine whether height information of a building included in the analysis domain is present.

In operation 903 of determining a unit domain of a $1^{st}$ Fresnel zone, when the height information of the building is absent, the generation apparatus may determine a unit domain corresponding to a Fresnel zone. In operation 904 of identifying a maximum height unit domain of a 2D same unit domain, the generation apparatus may identify a maximum height of a unit domain including the building of which the height information is present or the unit domain corresponding to the Fresnel zone.

In operation 905 of calculating an attenuation effect and an interference effect for each unit height, the generation apparatus may calculate an attenuation effect and an interference effect for each unit height. In this process, the generation apparatus may i) calculate an attenuation effect and an interference effect at each unit height through height-based calculation operation 906, ii) determine an interference effect based on a greatest height through operation 907 of calculating an effect for each height based on an equation after analyzing a greatest height effect or arithmetically calculate the interference effect for the height or less, or iii) determine the interference effect for each unit height in consideration of a Knife-edge diffraction loss according to a change of a Bullington point through operation 908 of performing calculation in consideration of a change in Bullington point.

In operation 909 of selecting another unit domain of a 2D domain, the generation apparatus may select another unit domain. In domain presence operation 910, the generation apparatus may determine whether another unit domain is present. When another unit domain is present, operations 904 through 908 may be performed with respect to the other unit domain. When another unit domain is absent, an interference effect at each unit height for all unit domains may be determined. Also, a 3D protection domain may be determined in operation 911 of calculating a 3D attenuation effect and a protection domain.

Figures 10A, 10B, 10C:
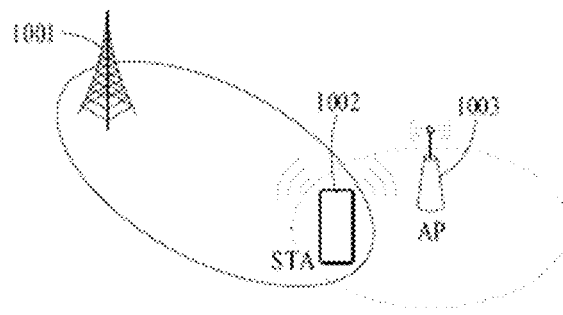
FIGS. 10A-10C are diagrams illustrating examples of network configuration of a new radio station and a protection domain determined based on an operation of the new radio station according to an example embodiment.

FIGS. 10A-10C are diagrams illustrating a network configuration of a new radio station and a protection domain determined based on an operation of the new radio station according to an example embodiment.

FIG. 10A shows a network configuration of a new radio station 1002. A network of the new radio station 1002 may include an access point (AP) 1003 and a new radio station 1002 (e.g., STA). The access point 1003 may be provided with location information, which the new radio station 1002 may be difficult to collect location information in real time.

For example, even if the access point 1003 is not located in a protection domain 1004, the new radio station 1002 connected to the access point 1003 may emit a signal in the protection domain 1004. Referring to FIG. 10, although the access point 1003 is not located in the protection domain 1004 of an existing radio station 1001, the new radio station 1002 connected to the access point 1003 may emit a signal in the protection domain 1004, which may cause an interference effect.

Accordingly, in consideration of a maximum distance between the new radio station 1002 and the access point 1003, a unit domain corresponding to or adjacent to a location of the access point 1003 may be determined to be the protection domain 1004. For example, (b) of FIG. 10 shows locations of the access point 1003 and the protection domain 1004 of an existing base station in an analysis domain.

In a case of FIG. 10B, although the access point 1003 does not belong to the protection domain 1004, a range to which the access point 1003 and the new radio station 1002 are connectable partially overlaps the protection domain 1004. Thus, the unit domain in which the access point 1003 is located may be determined to be a protection domain 1005.

FIG. 10C shows an example in which the unit domain including the access point 1003 is determined as the protection domain 1005. When the unit domain including the access point 1003 is determined as the protection domain 1005, a channel and transmission power available to the access point 1003, and transmission power and an output level of the new radio station 1002 may be restricted.

Figure 11:
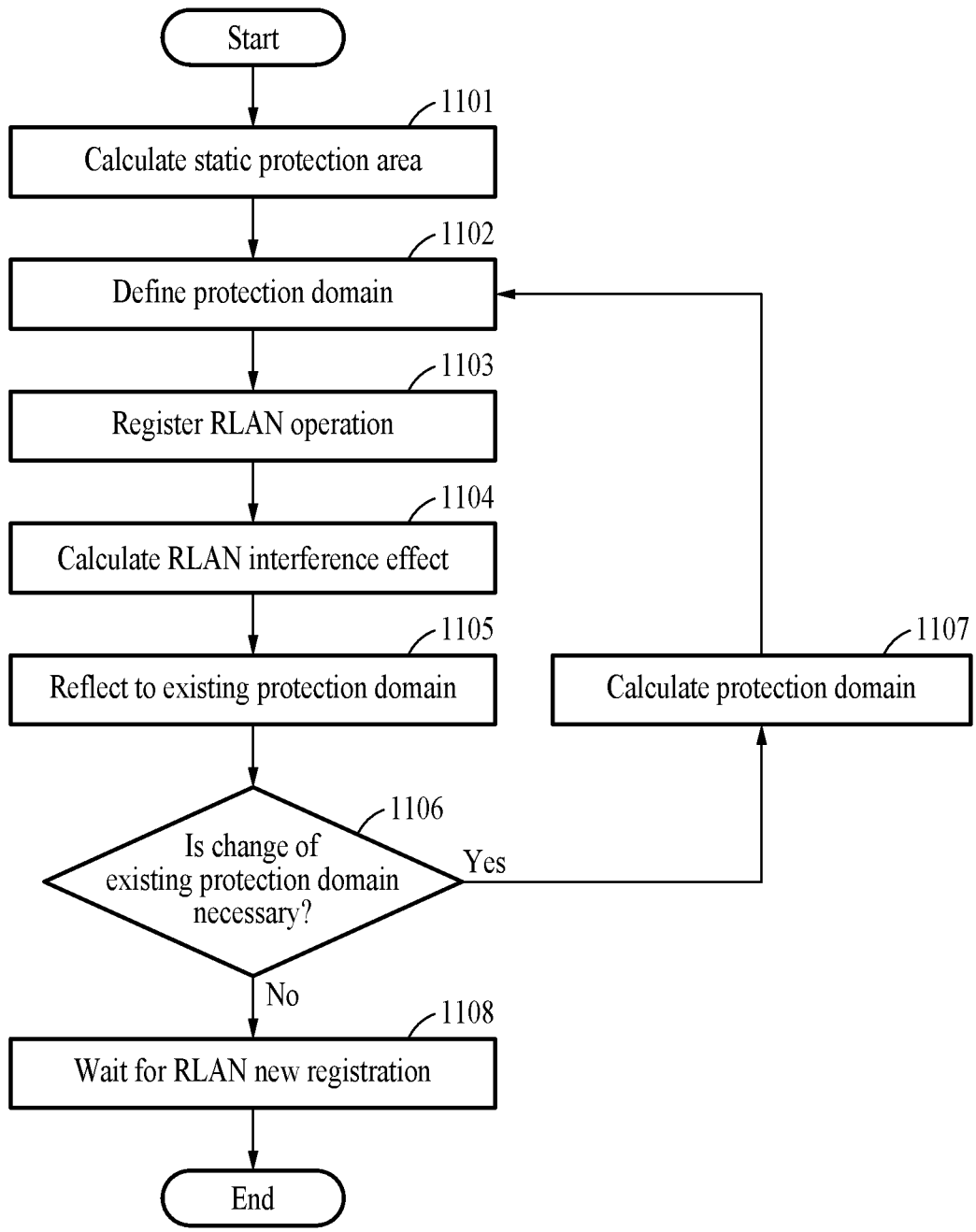
FIG. 11 is a flowchart illustrating a method of determining a protection domain based on an operation situation of a new radio station according to an example embodiment.

FIG. 11 is a flowchart illustrating a method of determining a protection domain based on an operating situation of a new radio station according to an example embodiment.

In static protection domain calculation operation 1101, a generation apparatus may statically determine a protection domain. For example, a protection domain of an existing radio station may be determined based on a reception mask of the existing radio station and transmission power, locations, and transmission masks of new radio stations of which location information is received.

In protection domain definition operation 1102, the generation apparatus may define a protection domain determined based on a threshold and an interference effect for each unit domain. In radio local area network (RLAN) operation registration operation 1103, the generation apparatus may register an operating situation of a new radio station (ex) RLAN). Specifically, the generation apparatus may collect information on whether the new radio station is indoor or outdoor, a location, a height, and the like of the new radio station.

In RLAN interference effect calculation operation 1104, the generation apparatus may calculate an interference effect again based on the information on whether the new radio station is indoor or outdoor, the location, the height, and the like of the new radio station (ex) RLAN). In existing protection domain reflection operation 1105, the generation apparatus may compare to the protection domain determined in operation 1101 based on the interference effect determined in consideration of the operating situation of the new radio station.

In existing protection domain change necessity operation 1106, the generation apparatus may determine whether to change the protection domain determined in operation 1101. When the interference effect of the unit domain that is not determined as the protection domain in operation 1101 is calculated in operation 1104, if the interference effect is greater than a threshold, the protection domain determined in operation 1101 may be changed in protection domain calculation operation 1107, and the protection domain may be defined again in protection domain definition operation 1102.

In RLAN new registration standby operation 1108, after all protection domains are determined, the generation apparatus may be on standby until information on another new radio station is received. When the information on the other new radio station is received, operations of FIG. 11 may be performed again.

Figure 12:
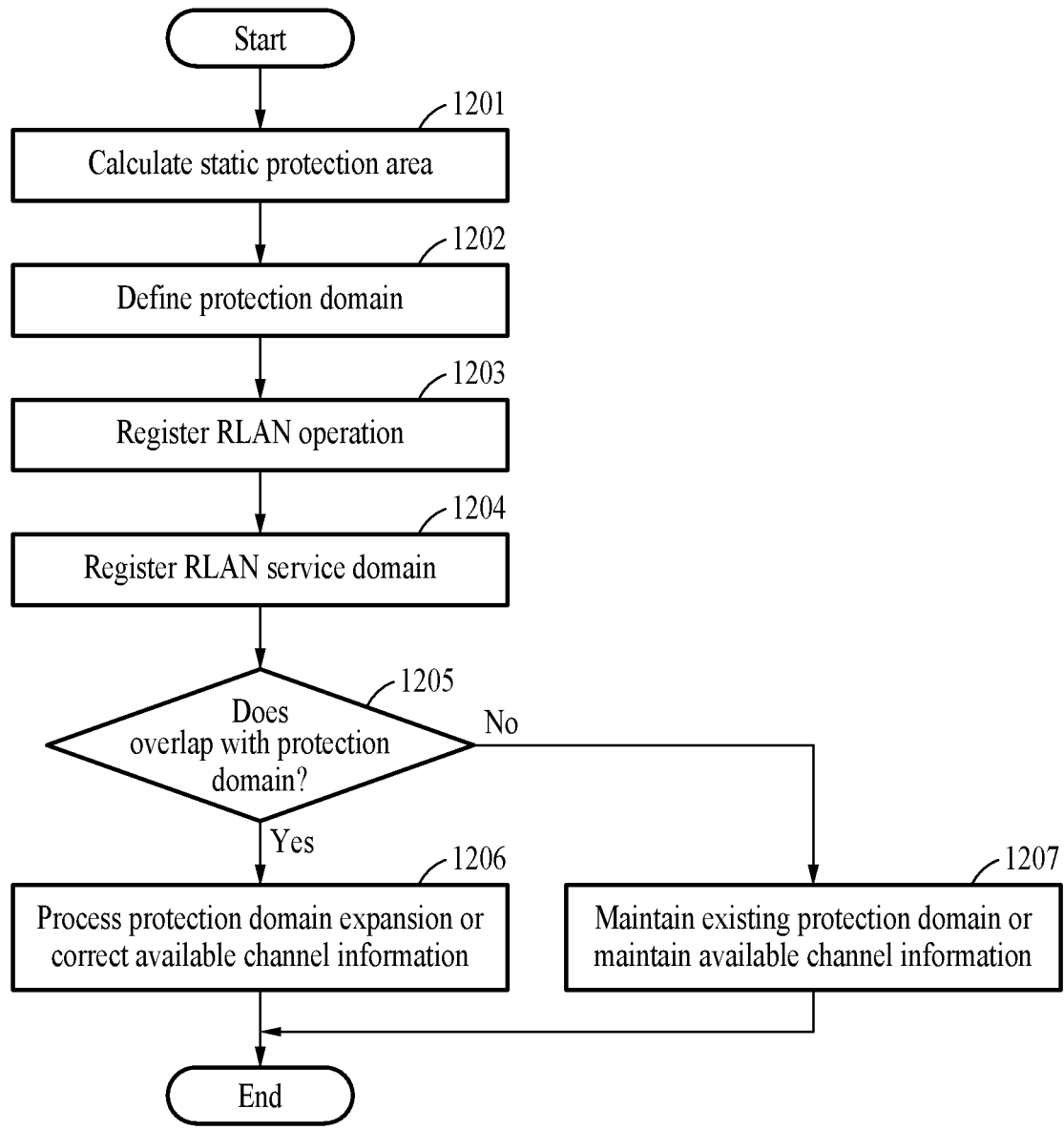
FIG. 12 is a flowchart illustrating a method of determining a protection domain based on an access point of a new radio station according to an example embodiment.

FIG. 12 is a flowchart illustrating a method of determining a protection domain based on an access point of a new radio station according to an example embodiment.

In static protection domain calculation operation 1201, a generation apparatus may statically determine a protection domain. For example, a protection domain of an existing radio station may be determined based on a reception mask of the existing radio station and transmission power, locations, and transmission masks of new radio stations of which location information is received.

In protection domain definition operation 1202, the generation apparatus may define a protection domain determined based on a threshold and an interference effect for each unit domain. In RLAN operation registration operation 1203, the generation apparatus may register an operating situation of a new radio station (ex) RLAN). Specifically, the generation apparatus may collect information on whether the new radio station is indoor or outdoor, a location, a height, a service domain, and the like of the new radio station.

In RLAN service domain calculation operation 1204, the generation apparatus may collect a service domain of a new radio station that does not belong to a protection domain among new radio stations, such as an access point. In overlap-with-protection-domain operation 1205, whether the service domain of the new radio station overlaps the protection domain of the existing radio station may be determined.

When the service domain of the new radio station overlaps the protection domain of the existing radio station, in protection domain expansion processing or available channel information correction operation 1206, the generation apparatus may correct the protection domain and change information on a channel available to the new radio station. Alternatively, since it may vary based on an operation of the new radio station, instead of the protection domain or the information of the channel, information provided to the new radio station may be changed.

When the service domain of the new radio station does not overlap the protection domain of the existing radio station, in existing protection domain maintenance or available channel information maintenance operation 1207, the generation apparatus may maintain the protection domain and maintain the information on the channel available to the new radio station.

Figure 13:
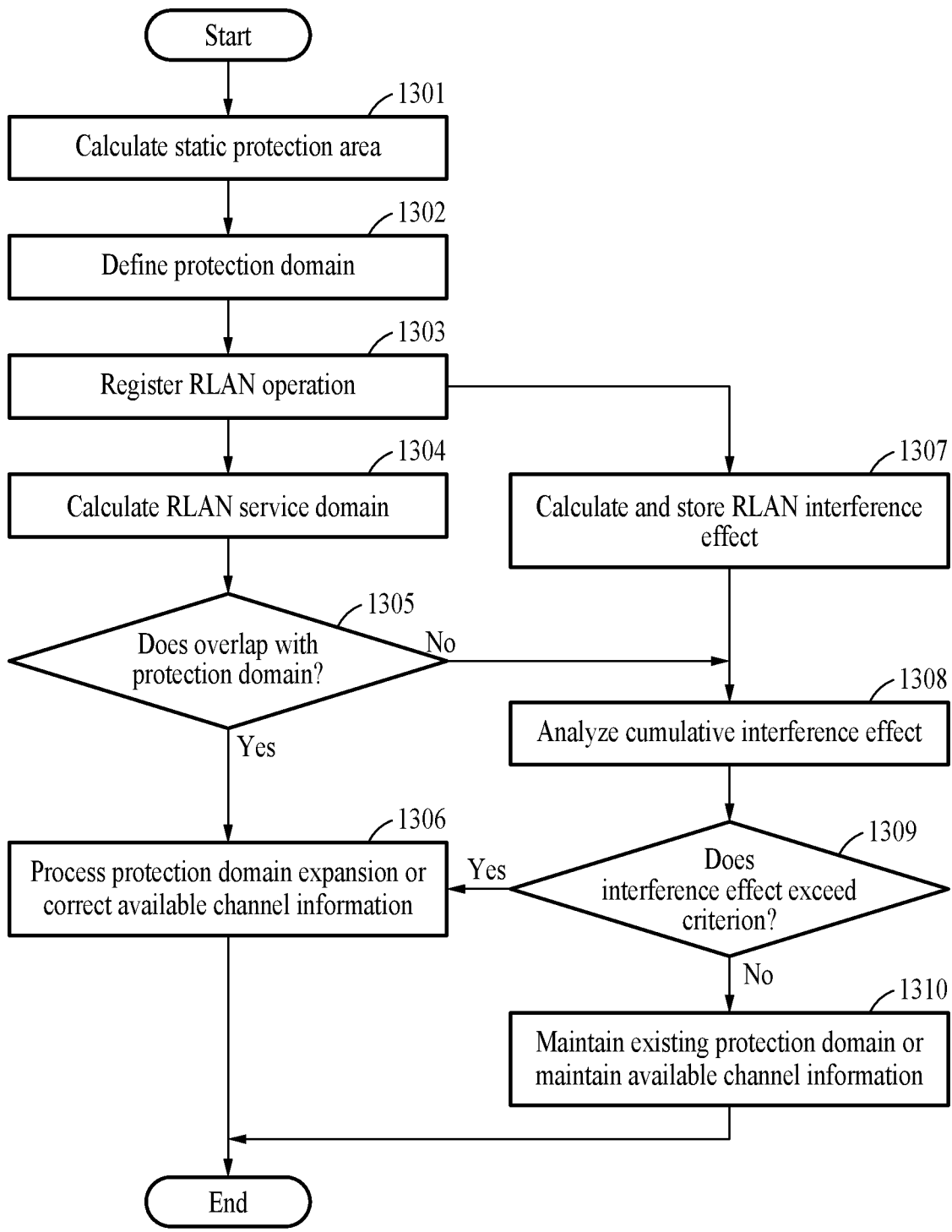
FIG. 13 is a flowchart illustrating a method of determining a protection domain based on an access point of a new radio station and a cumulative interference effect according to an example embodiment.

FIG. 13 is a flowchart illustrating a method of determining a protection domain based on an access point of a new radio station and a cumulative interference effect according to an example embodiment.

In static protection domain calculation operation 1301, a generation apparatus may statically determine a protection domain. For example, a protection domain of an existing radio station may be determined based on a reception mask of the existing radio station and transmission power, locations, and transmission masks of new radio stations of which location information is received.

In protection domain definition operation 1302, the generation apparatus may define a protection domain determined based on a threshold and an interference effect for each unit domain. In RLAN operation registration operation 1303, the generation apparatus may register an operating situation of a new radio station (ex) RLAN). Specifically, the generation apparatus may collect information on whether the new radio station is indoor or outdoor, a location, a height, a service domain, and the like of the new radio station.

In RLAN service domain calculation operation 1304, the generation apparatus may collect a service domain of a new radio station that does not belong to a protection domain among new radio stations such as an access point. In overlap-with-protection-domain operation 1305, whether the service domain of the new radio station overlaps the protection domain of the existing radio station may be determined.

When the service domain of the new radio station overlaps the protection domain of the existing radio station, in protection domain expansion processing or available channel information correction operation 1306, the generation apparatus may correct the protection domain and change information on an available channel to be used in the new radio station. Alternatively, since it may vary based on an operation of the new radio station, instead of the protection domain or channel information, information provided to the new radio station may be changed.

In operation 1307 of calculating and storing an RLAN interference effect, the generation apparatus may register an operating situation for each new radio station. Specifically, the generation apparatus may collect information on whether new radio stations are indoor or outdoor, locations, heights, service domains, and the like of the new radio stations.

When the service domain of the new radio station does not overlap the protection domain of the existing radio station, in protection domain expansion processing or available channel information correction operation 1308, the generation apparatus may determine a cumulative interference effect for each unit domain in consideration of operations of a plurality of new radio stations.

In interference-effect-exceeding-criterion operation 1309, the generation apparatus may determine whether the cumulative interference effect exceeds a threshold. In protection domain expansion processing or available channel information correction operation 1306, when the cumulative interference effect exceeds the threshold, the protection domain and information on a channel available to the new radio station may be corrected.

In existing protection domain maintenance or available channel information maintenance operation 1310, when the cumulative interference effect does not exceed the threshold, the generation apparatus may maintain the protection domain and maintain the information on the channel available to the new radio station.

FIG. 14 is a diagram illustrating an example of a protection domain determined based on a cumulative interference effect according to an example embodiment.

According to an example embodiment, a generation apparatus may determine a cumulative interference effect based on a location and an operation parameter of a new radio station. The operation parameter may include whether being located indoors or outdoors, an antenna pattern, an antenna directivity, a height, an output level, an installation height, a bandwidth, and an indoor building characteristic. An interference effect according to the operation parameter may be determined in advance based on previous statistics. The operation parameter may be determined based on an actual measurement value and also be determined by a user in advance.

According to an example embodiment, the generation apparatus may determine a protection domain of an existing radio station for a specific new radio station and additionally set a protection domain based on an interference effect caused by another new radio station among unit domains that are not determined as a protection domain.

The generation apparatus may determine a protection domain of an existing radio station for a specific new radio station and determine a new protection domain among unit domains that are not determined as a protection domain when an interference effect caused by another new radio station is greater than a threshold.

According to an example embodiment, when determining a protection domain based on a single interference effect, the generation apparatus may set a relatively low threshold and determine a protection domain. The protection domain may be widen compared to before the threshold is lowered. The generation apparatus may correct the determined protection domain by calculating a cumulative interference effect for each unit domain.

Referring to FIG. 14, a protection domain 1401 determined based on an initial threshold may be determined and a protection domain 1402 may be added according to the threshold corrected in consideration of the cumulative interference effect.

Figure 15:
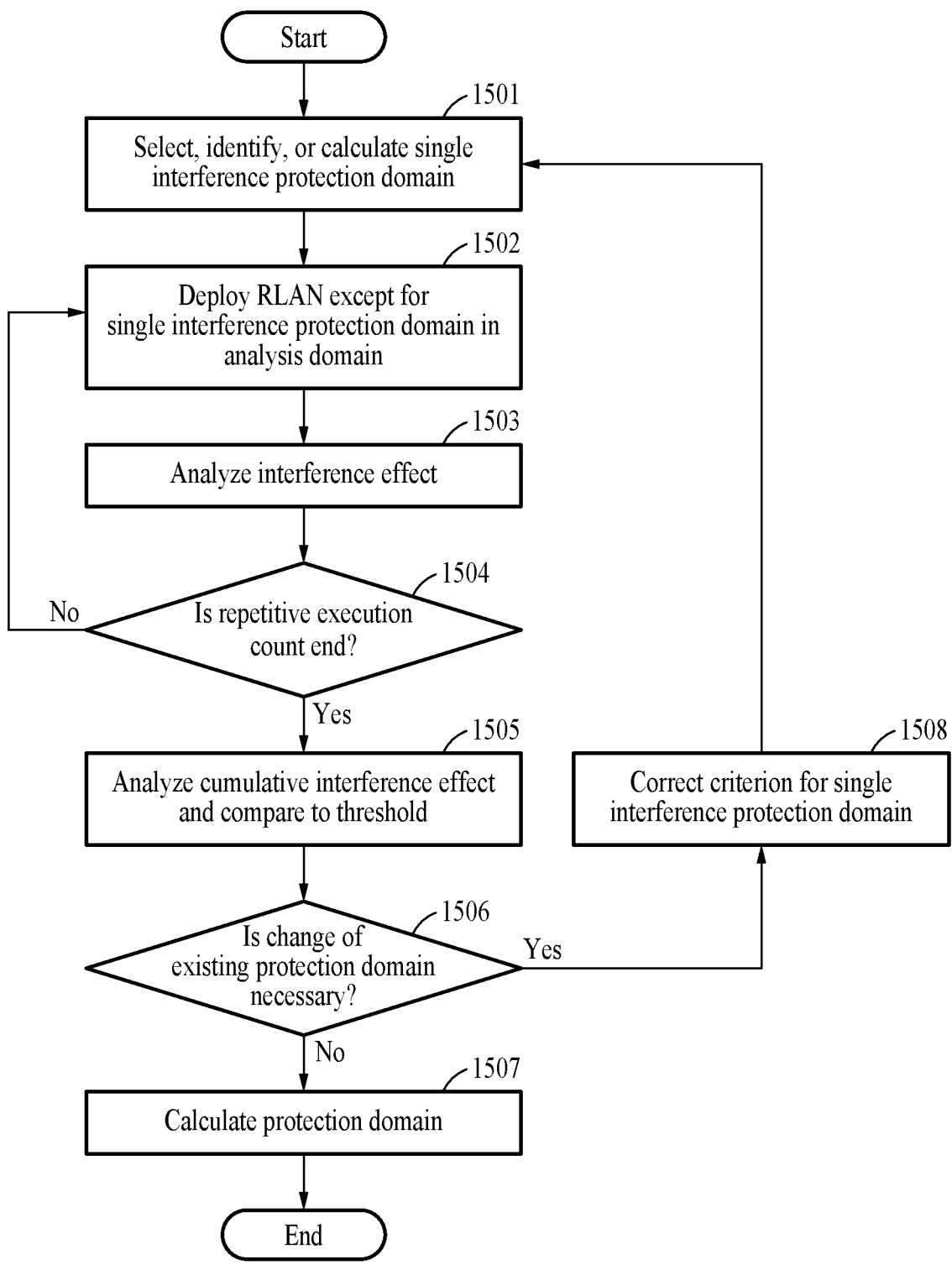
FIG. 15 is a flowchart illustrating a process of determining a protection domain again in response to a threshold being corrected according to an example embodiment.

FIG. 15 is a flowchart illustrating a process of determining a protection domain again in response to a threshold being corrected according to an example embodiment.

In operation 1501 of selecting, identifying, or calculating a single interference protection domain, a generation apparatus may determine a protection domain based on a single interference effect for each unit domain. In operation 1502 of performing RLAN deployment except for a single interference protection domain in an analysis domain, the generation apparatus may identify a new radio station located in a unit domain instead of the determined protection domain.

In operation 1503 of analyzing an interference effect, the generation apparatus may calculate an interference effect caused by the new radio station located in the unit domain instead of the determined protection domain. In repetitive execution count end operation 1504, the generation apparatus may compare the number of times that the interference effect on the new radio station located in the unit domain instead of the determined protection domain is calculated to the predetermined number of repetitive executions.

When the number of times that the interference effect on the new radio station located in the unit domain instead of the determined protection domain is calculated is greater than the predetermined number of repetitive executions, operations 1502 through 1504 may be performed for another new radio station.

When the number of times that the interference effect on the new radio station located in the unit domain instead of the determined protection domain is calculated is equal to the predetermined number of repetitive executions, in operation 1505 of analyzing a cumulative interference effect and comparing it to a threshold, the generation apparatus may determine a cumulative interference effect for each unit domain in consideration of all new radio stations included in the analysis domain.

In addition, for each unit domain, the generation apparatus may compare the interference effect determined in operation 1501 and the interference effect determined in operation 1504. In existing protection domain change necessity operation 1506, the generation apparatus may determine whether to change the interference effect determined in operation 1501.

In protection domain calculation operation 1507, for each unit domain, when the interference effect determined in operation 1501 is greater than the interference effect determined in operation 1504, the generation apparatus may determine a protection domain based on the interference effect determined in operation 1501.

For each unit domain, when the interference effect determined in operation 1501 is less than the interference effect determined in operation 1504, the generation apparatus may perform single interference protection domain criterion correction operation 1508. In single interference protection domain criterion correction operation 1508, the generation apparatus may correct the threshold used in operation 1501 and compare the single interference effect to the corrected threshold, thereby determining a protection domain again.

Figure 16:
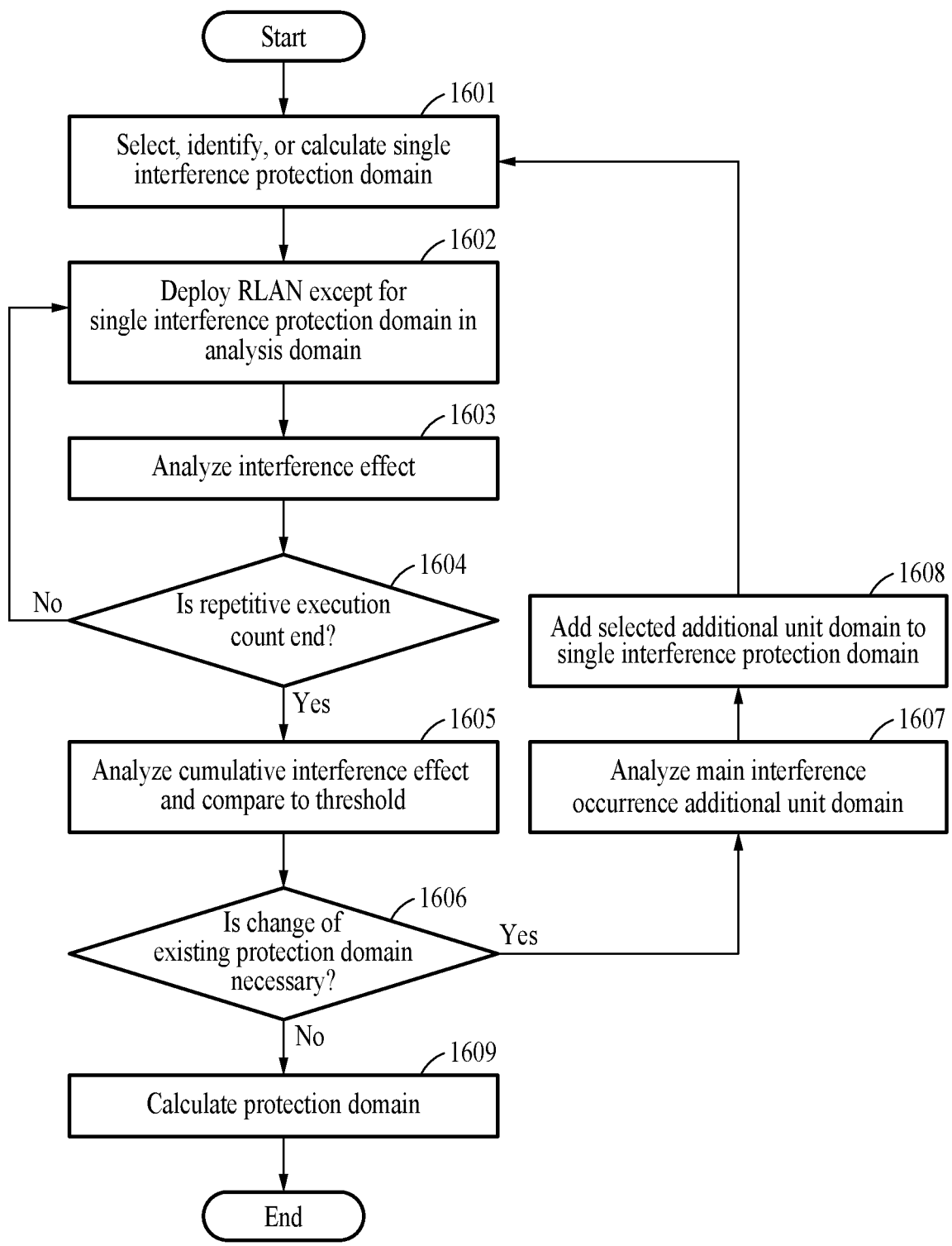
FIG. 16 is a flowchart illustrating a process of correcting a protection domain based on a cumulative interference effect according to an example embodiment.

FIG. 16 is a flowchart illustrating a process of correcting a protection domain based on a cumulative interference effect according to an example embodiment.

In operation 1601 of selecting, identifying, or calculating a single interference protection domain, a generation apparatus may determine a protection domain based on a single interference effect for each unit domain. In operation 1602 of performing RLAN deployment except for a single interference protection domain in an analysis domain, the generation apparatus may identify a new radio station located in a unit domain instead of the determined protection domain.

In operation 1603 of analyzing an interference effect, the generation apparatus may calculate an interference effect caused by the new radio station located in the unit domain instead of the determined protection domain. In repetitive execution count end operation 1604, the generation apparatus may compare the number of times that the interference effect on the new radio station located in the unit domain instead of the determined protection domain is calculated to the predetermined number of repetitive executions.

When the number of times that the interference effect on the new radio station located in the unit domain instead of the determined protection domain is calculated is greater than the predetermined number of repetitive executions, operations 1602 through 1604 may be performed for another new radio station.

When the number of times that the interference effect on the new radio station located in the unit domain instead of the determined protection domain is calculated is equal to the predetermined number of repetitive executions, in operation 1605 of analyzing a cumulative interference effect and comparing it to a threshold, the generation apparatus may determine a cumulative interference effect for each unit domain in consideration of all new radio stations included in the analysis domain.

In addition, for each unit domain, the generation apparatus may compare the interference effect determined in operation 1601 and the interference effect determined in operation 1604. In existing protection domain change necessity operation 1606, the generation apparatus may determine whether to change the interference effect determined in operation 1601.

In protection domain calculation operation 1609, for each unit domain, when the interference effect determined in operation 1601 is greater than the interference effect determined in operation 1604, the generation apparatus may determine a protection domain based on the interference effect determined in operation 1601.

When the interference effect determined in operation 1601 is less than the interference effect determined in operation 1604, the generation apparatus may perform main interference occurrence additional unit domain analysis operation 1607. In main interference occurrence additional unit domain analysis operation 1607, the generation apparatus may determine a unit domain that satisfies one of i) a unit domain having a greatest cumulative interference effect among repetition counts, ii) a unit domain in which a cumulative interference effect is greater than or equal to a predetermined value, iii) a unit domain in which a cumulative interference effect greater than or equal to a predetermined value occurs the predetermined number of times or more among repetition counts, and iv) as a cumulative interference analysis result, at the repetition higher than a threshold, a unit domain corresponding to the greatest cumulative interference effect or an interference effect greater than or equal to a predetermined range.

In operation 1608 of adding a selected additional unit domain to a single interference protection domain, the generation apparatus may add the determined unit domain to be a protection domain. It is possible to determine as a protection domain additionally. And then, operations 1601 through 1606 may be performed again.

FIG. 17 is a diagram illustrating an example of expanding a protection domain according to an example embodiment.

According to an example embodiment, when correcting a protection domain 1703 determined based on a single interference effect, a generation apparatus may calculate a cumulative interference effect of a unit domain that is not the protection domain 1703 based on the predetermined number of new radio stations 1702 among new radio stations that do not belong to the protection domain 1703.

According to an example embodiment, the generation apparatus may calculate a cumulative interference effect based on a unit domain that corresponds to a relatively large cumulative interference effect or located at a boundary of the protection domain among unit domains that are not the protection domain 1703. When a cumulative interference effect of a specific unit domain 1704 is greater than a threshold, the generation apparatus may add the specific unit domain 1704 to be the protection domain 1703.

Figure 18:
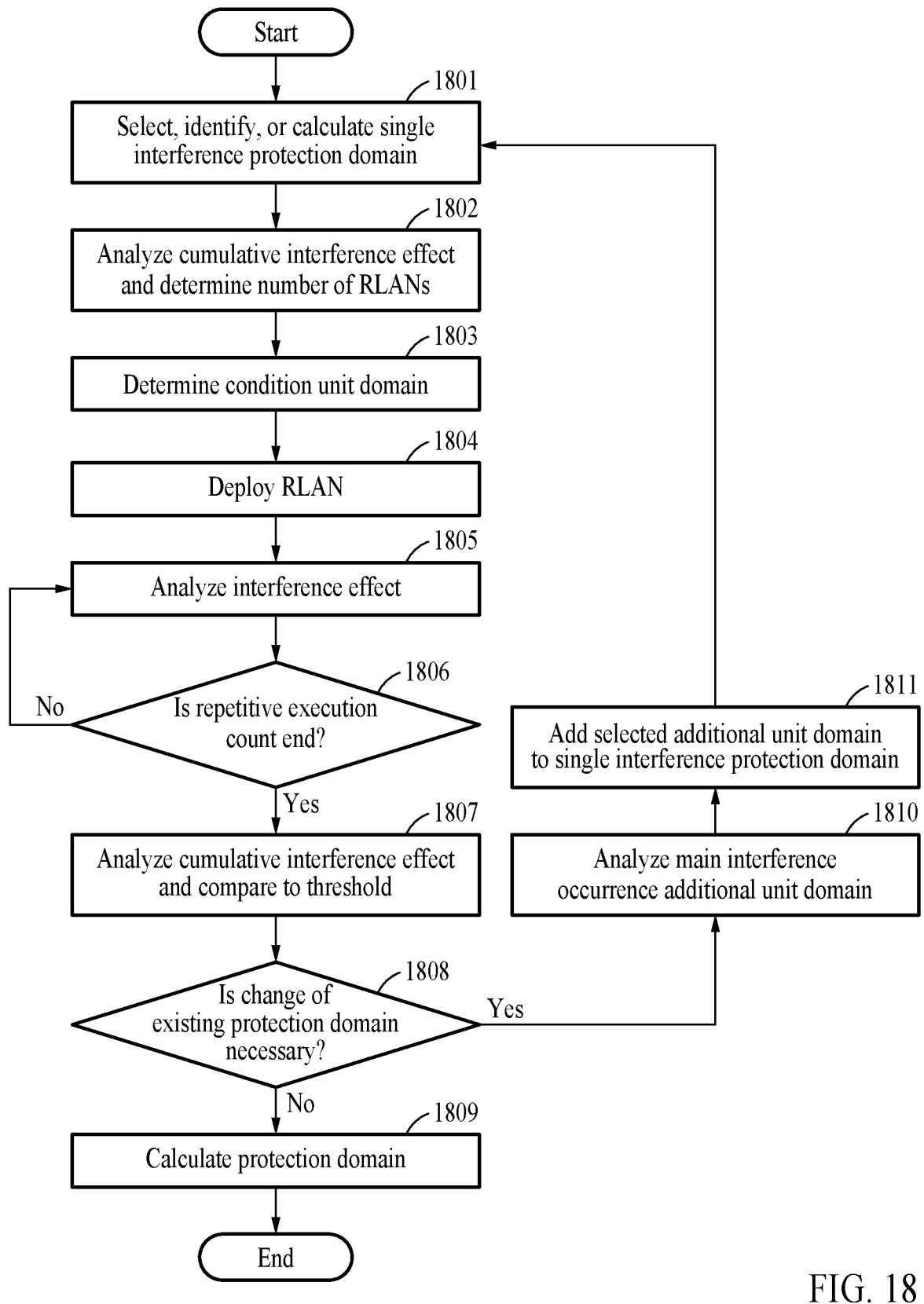
FIG. 18 is a flowchart illustrating a process of correcting a protection domain according to an example embodiment.

FIG. 18 is a flowchart illustrating a process of correcting a protection domain according to an example embodiment.

In operation 1801 of selecting, identifying, or calculating a single interference protection domain, a generation apparatus may determine a protection domain based on a single interference effect for each unit domain. In operation 1802 of analyzing a cumulative interference effect and determining the number of RLANs, the generation apparatus may determine the number of radio stations to be taken into consideration when calculating a cumulative interference effect.

In operation 1803 of determining a condition unit domain, the generation apparatus may determine a unit domain adjacent to the unit domain determined as the protection domain in operation 1801 or a unit domain likely to have a high cumulative interference effect, to be a condition unit domain.

In RLAN deployment operation 1804, the generation apparatus may collect information on the new radio station determined in operation 1802. In operation 1805 of analyzing an interference effect, the generation apparatus may calculate a single interference effect for the determined new radio station.

Based on the new radio station determined in operation 1802, the generation apparatus may determine a cumulative interference effect of the unit domain determined in operation 1805. At this time, it may be repeated such that the cumulative interference effect is accurately determined through operation 1806 of terminating repetitive execution.

When the cumulative interference effect is determined, in operation 1807 of analyzing a cumulative interference effect and analyzing a threshold, the generation apparatus may compare the cumulative interference effect of the unit domain and the threshold. In existing protection domain change necessity operation 1808, the generation apparatus may determine whether to change the interference effect determined in operation 1801.

In protection domain calculation operation 1809, for a unit domain, when the interference effect determined in operation 1801 is greater than the interference effect determined in operation 1804, the generation apparatus may determine a protection domain based on the interference effect determined in operation 1801.

For the unit domain, when the interference effect determined in operation 1801 is not greater than the interference effect determined in operation 1804, the generation apparatus may perform main interference occurrence additional unit domain analysis operation 1810. In main interference occurrence additional unit domain analysis operation 1810, the generation apparatus may identify a unit domain of the cumulative interference effect determined in operation 1807. In operation 1811 of adding a selected additional unit domain to a single interference protection domain, the generation apparatus may determine the identified unit domain to be a protection domain.

Figure 19:
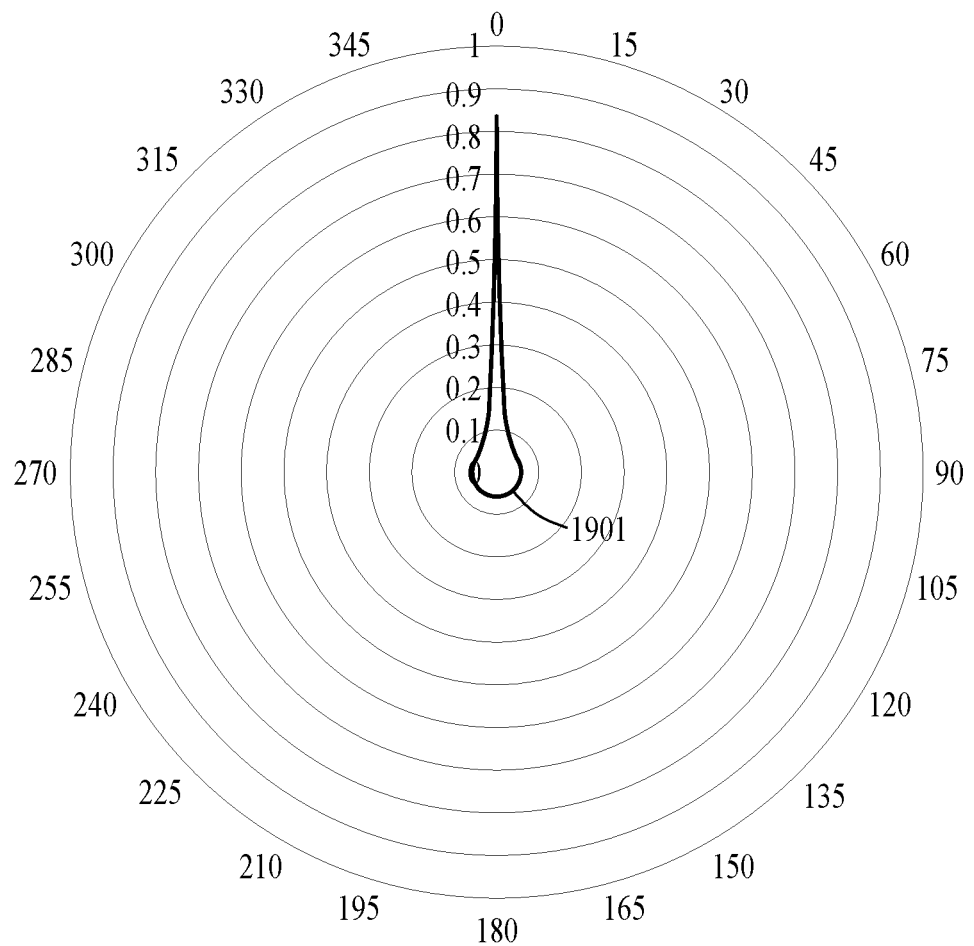
FIG. 19 is a diagram illustrating an example of a reception antenna pattern of an existing radio station receiving a primary service according to an example embodiment.

FIG. 19 is a diagram illustrating an example of a reception antenna pattern of an existing radio station receiving a primary service according to an example embodiment.

When a receiving antenna pattern of an existing radio station receiving a primary service is oriented in a predetermined direction, a protection domain may be determined based on the predetermined direction and a concentric circle 1901 around the existing radio station. Referring to FIG. 19, the receiving antenna pattern of the existing radio station may be in a zero-degree direction (upper). In this case, the protection domain may be determined based on the receiving antenna pattern of the existing radio station.

Figure 20:
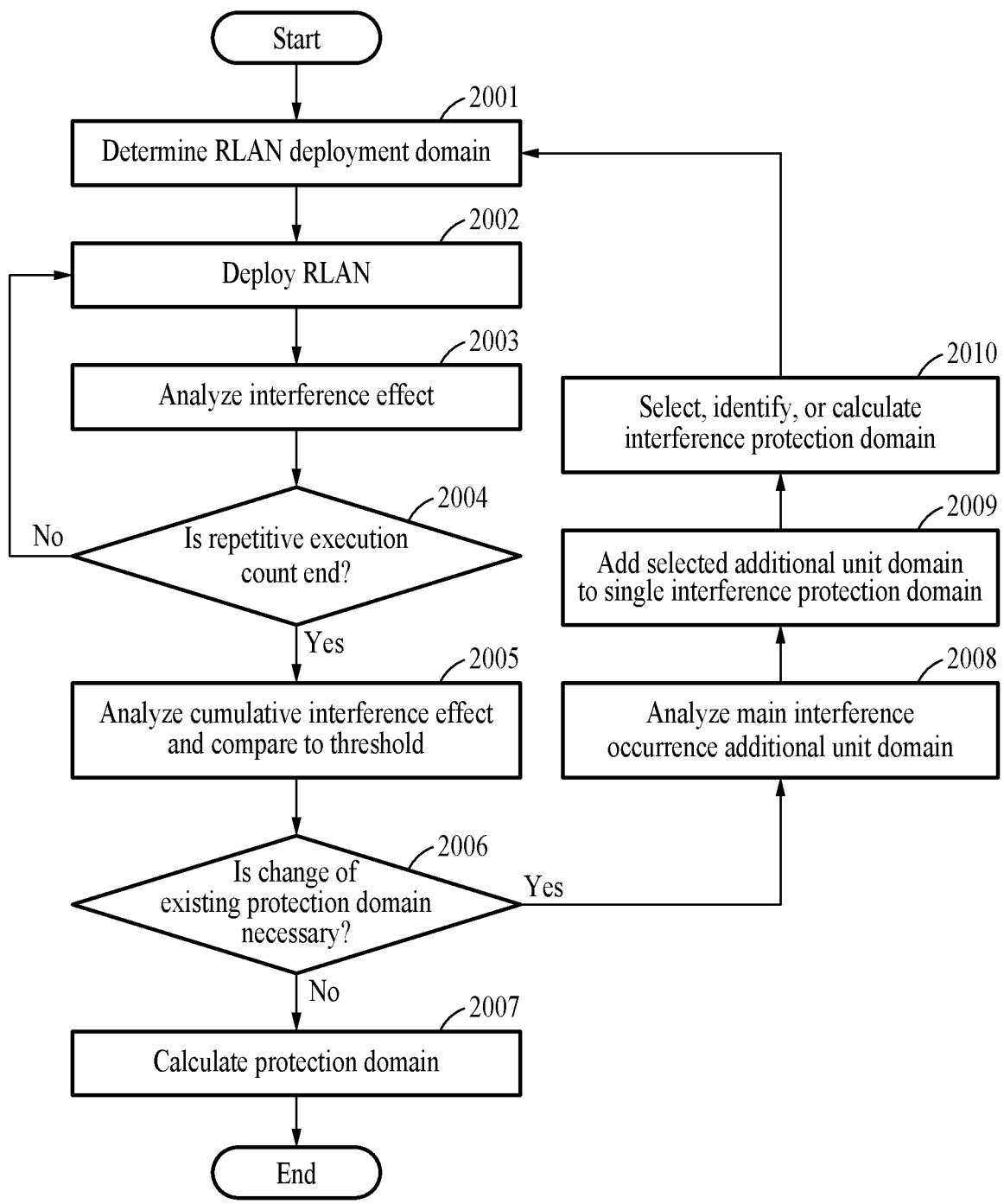
FIG. 20 is a flowchart illustrating a process of determining a protection domain for a predetermined number of new radio stations without an initial protection domain according to an example embodiment.

FIG. 20 is a flowchart illustrating a process of determining a protection domain for a predetermined number of new radio stations without an initial protection domain according to an example embodiment.

In operation 2001 of determining an RLAN deployment domain, a generation apparatus may collect information about a new radio station included in an analysis domain. In RLAN deployment operation 2002, the generation apparatus may select a predetermined new radio station. From the new radio station, the generation apparatus may receive information on the new radio station.

In operation 2003 of analyzing an interference effect, the generation apparatus may determine a single interference effect for each unit domain of the predetermined new radio station. In repetitive execution count end operation 2004, the generation apparatus may calculate a single interference effect for each unit domain with respect to another new radio station included in an analysis domain until reaching the number of repetitions.

In operation 2005 of analyzing a cumulative interference effect and comparing it to a threshold, the generation apparatus may determine a cumulative interference effect by calculating a total single interference effect for each unit domain due to all the new radio stations in the analysis domain.

In existing protection domain change necessity operation 2006, the generation apparatus may determine whether to change a protection domain determined using the single interference effect, based on the cumulative interference effect determined in operation 2005.

In protection domain calculation operation 2007, when a difference between the single interference effect and the cumulative interference effect determined for the unit domain in operation 2005 is less than or equal to a predetermined criterion, the generation apparatus may determine the unit domain to be the protection domain determined based on the single interference effect.

In main interference occurrence additional unit domain analysis operation 2008, when a difference between the single interference effect and the cumulative interference effect determined for the unit domain in operation 2005 is greater than the predetermined criterion, the generation apparatus may identify unit domains adjacent to the protection domain determined based on the single interference effect.

In operation 2009 of adding a selected additional unit domain to a single interference protection domain, the generation apparatus may calculate the interference effect again for the identified unit domain in consideration of whether being located indoors or outdoors, a service domain, and a height of the new radio station and add the identified unit domain to the protection domain when the interference effect is greater than or equal to a threshold.

In operation 2010 of selecting, identifying, or calculating an interference or protection domain, the generation apparatus may identify adjacent unit domains based on the added protection domain and perform operation 2001 again.

Figure 21A:
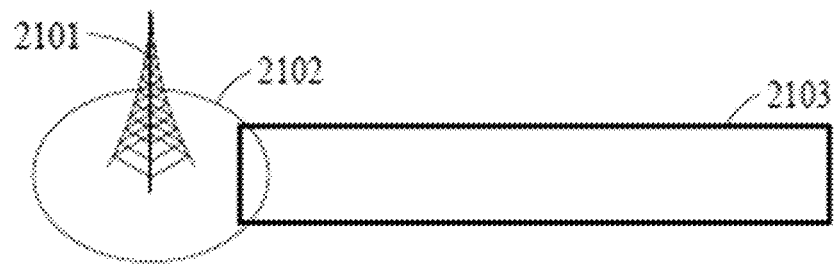
FIGS. 21A-21D are diagrams illustrating examples of setting a predetermined interference domain and determining a final protection domain based on the set interference domain according to an example embodiment.

FIGS. 21A-12D are diagrams illustrating examples of setting a predetermined interference domain and determining a final protection domain based on the set interference domain according to an example embodiment.

An interference domain may be composed of unit domains and may refer to a predetermined domain included in an analysis domain. A generation apparatus may set a plurality of interference domains in the analysis domain and determine a final protection domain 2108 based on an interference effect determined in each interference domain.

For example, the interference domain is not limited to a specific shape and may be defined as a general shape such as a square or a circle, a sector shape in a specific direction, a predetermined model, or an equation. Referring to FIG. 21A, the interference domain may be defined as a circle (a first interference domain 2102) including an existing radio station 2101 on a center and a quadrangle (a second interference domain 2103) formed in an antenna-oriented direction of a receiving antenna of the existing radio station 2101.

Figure 21B:
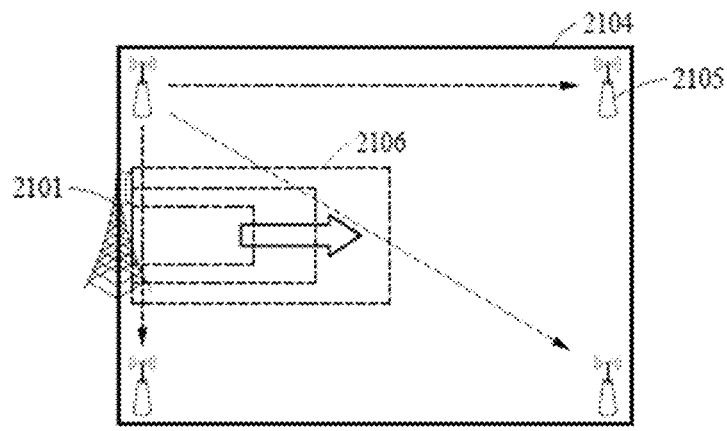

For example, referring to FIG. 21B, the generation apparatus may receive information on the new radio stations 2105 of an analysis domain 2104 including the second interference domain 2103. The generation apparatus may expand the second interference domain 2103 based on a cumulative interference effect caused by the new radio stations 2105 of the analysis domain 2104.

Figure 21C:
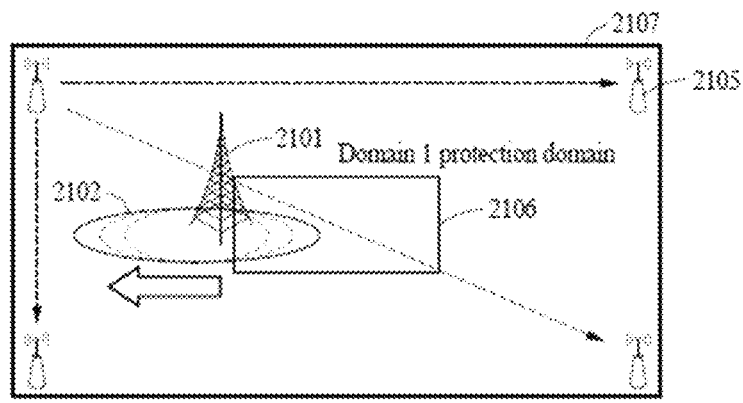

For example, referring to FIG. 21C, the generation apparatus may receive information on the new radio stations 2105 of an analysis domain 2107 including the first interference domain 2102. The generation apparatus may expand the first interference domain 2102 based on a cumulative interference effect caused by the new radio stations 2105 of the analysis domain 2107.

To expand an interference effect, the generation apparatus may compare the cumulative interference effect and a threshold. The generation apparatus may expand the interference effect until the cumulative interference effect for each unit domain of the first interference domain 2102 or the second interference domain 2103 is smaller than the threshold.

Figure 21D:
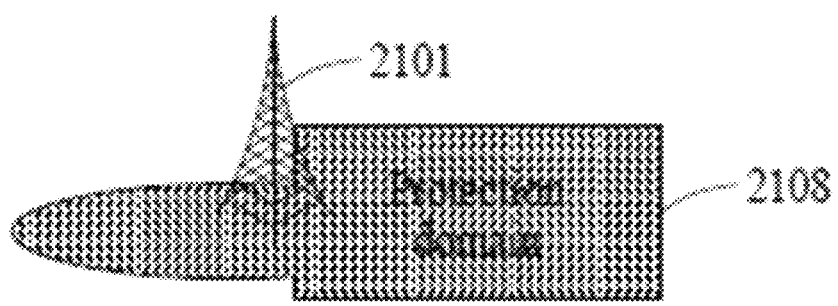

The generation apparatus may apply different thresholds when expanding the first interference domain 2102 and the second interference domain 2103. A threshold used for each interference domain may be determined based on a popularity density of the analysis domain 2107 including the interference domain and an expected protection domain. The expected protection domain may be determined based on a single interference effect or an antenna pattern of a primary service. Referring to FIG. 21D, the generation apparatus may determine the final protection domain 2108 based on the expanded first interference domain 2102 and second interference domain 2103.

Figure 22:
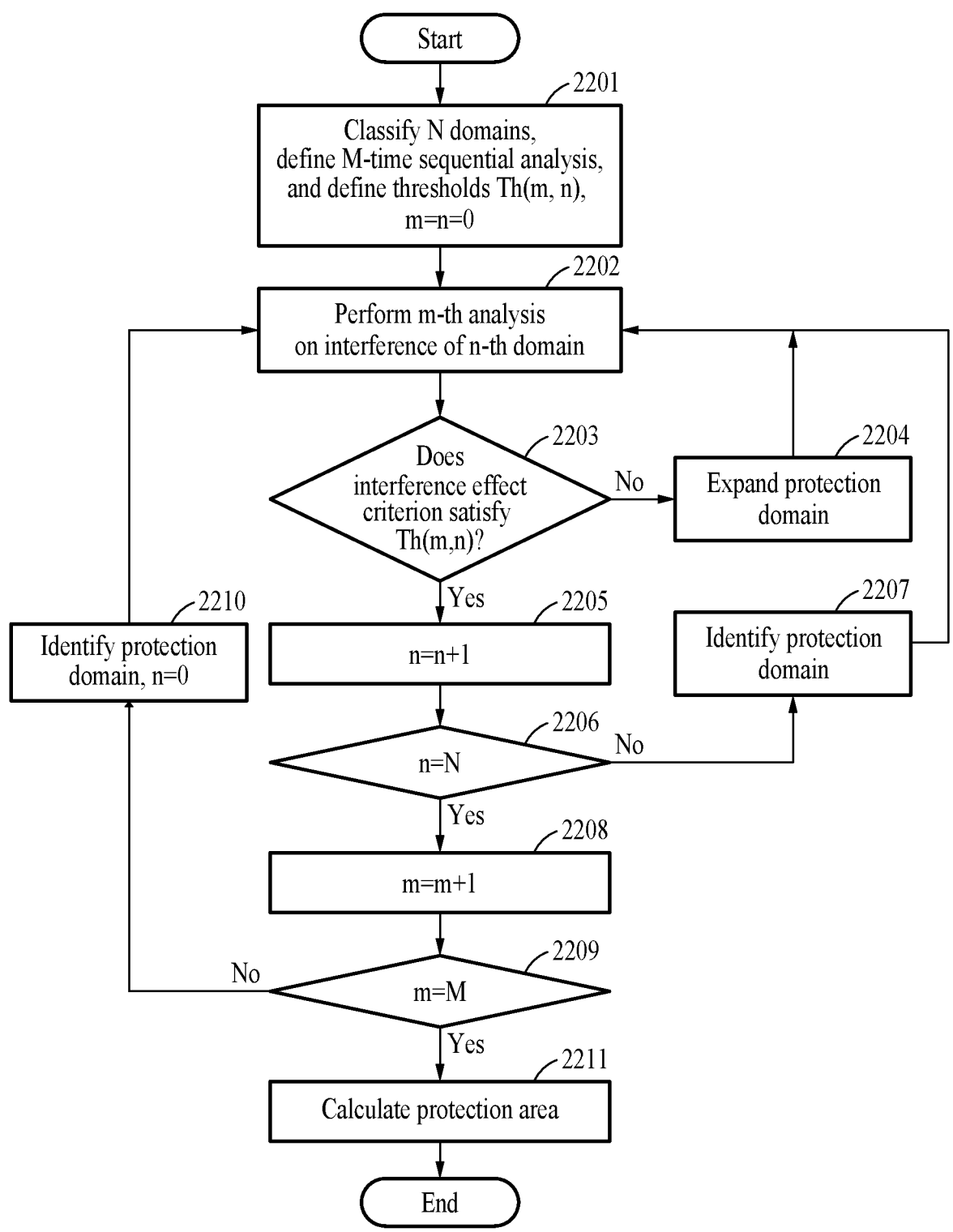
FIG. 22 is a flowchart illustrating a process of setting a predetermined interference domain and determining a final protection domain based on the set interference domain according to an example embodiment.

FIG. 22 is a flowchart illustrating a process of setting a predetermined interference domain and determining a final protection domain based on the set interference domain according to an example embodiment.

In operation 2201 of classifying N domains, defining M-time sequential analysis, and defining thresholds Th(m, n) where m=n=0, the generation apparatus may set N interference domains in an analysis domain, define the number of times for sequential analysis, and define a threshold used for each sequential analysis of each interference domain. The sequential analysis may refer to a process of expanding an interference domain according to a cumulative interference effect.

In operation 2202 of performing an m-th analysis on interference of an n-th domain, the generation apparatus performs an m-th sequential analysis for an n-th interference domain. In interference effect criterion satisfaction Th(m,n) operation 2203, the generation apparatus may determine whether the cumulative interference effect determined in the m-th sequential analysis of the n-th interference domain is less than a threshold.

When the cumulative interference effect determined in the m-th sequential analysis of the n-th interference domain is greater than the threshold, the generation apparatus may expand a protection domain in protection domain expansion operation 2204. When the cumulative interference effect determined in the m-th sequential analysis of the n-th interference domain is less than the threshold, the generation apparatus may increase an index of an interference domain in operation 2205 of n=n+1.

Also, in operation 2206 of n=N, when the m-th sequential analysis is not performed for all interference domains, the generation apparatus may identify a protection domain in protection domain identification operation 2207 and perform operation 2202 on a next interference domain. When the sequential analysis is performed on all interference domains, the generation apparatus may increase an index of the sequential analysis in operation 2208 of m=m+1.

When the sequential analysis is not performed M times in operation 2209 of m=M, the generation apparatus may set the index of the interference domain to zero in operation 2210 of identifying a protection domain, where n=0 and perform an (m+1)-th sequential analysis on all the interference domains.

When the sequential analysis is not performed M times in m=M operation 2209, the generation apparatus may determine a protection domain by combining the analyzed interference domains in n=0, protection domain calculation 2211. According to another example embodiment, when performing a sequential analysis, the generation apparatus may analyze an interference effect to be in three dimensions.

Figure 23:
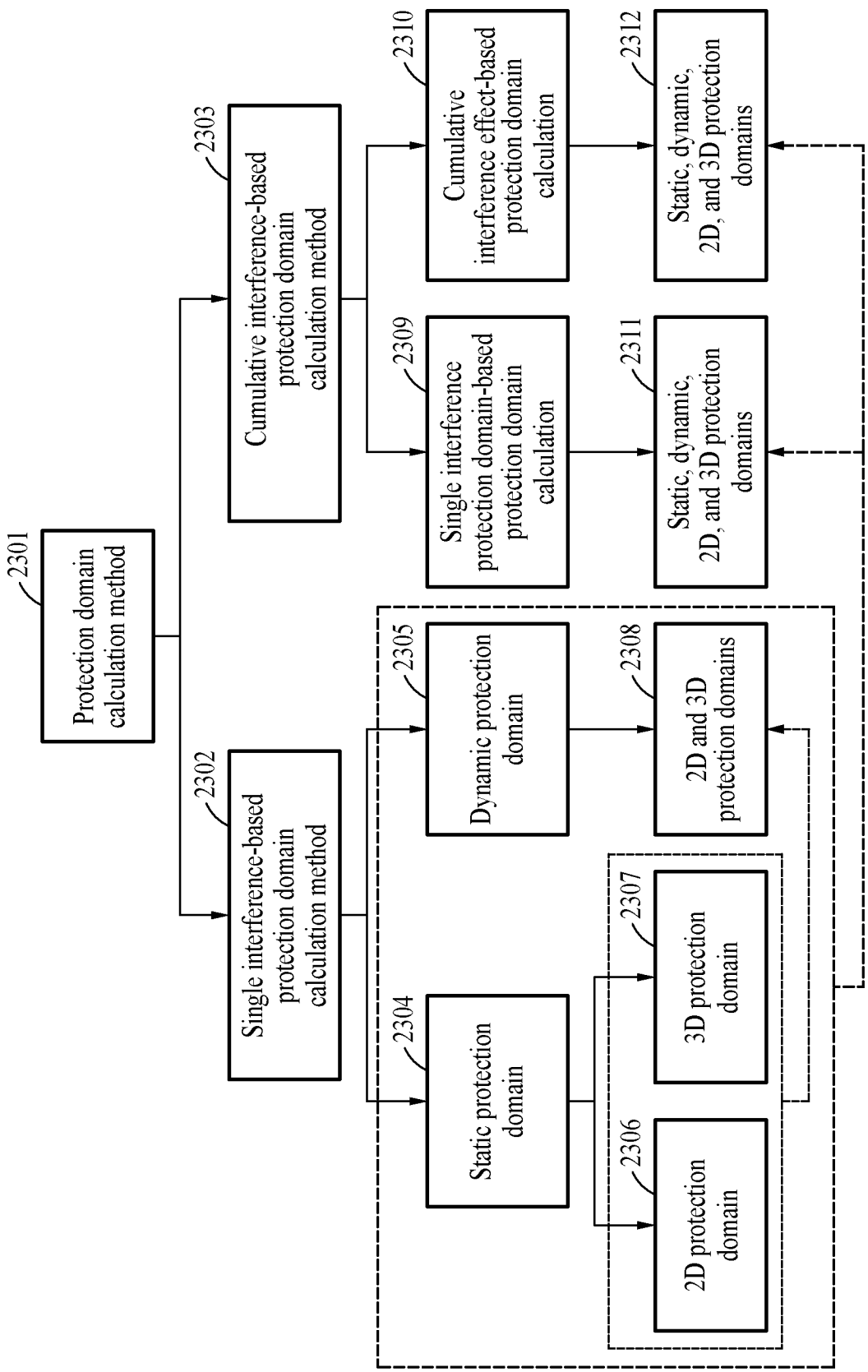
FIG. 23 illustrates examples of determining a protection domain according to an example embodiment.

FIG. 23 illustrates examples of determining a protection domain according to an example embodiment.

A generation apparatus may determine a protection domain using embodiments illustrated in FIG. 23. In embodiment 2301, to determine a protection domain, the generation apparatus may use embodiment 2302 of determining a protection domain based on a single interference effect or embodiment 2303 of determining a protection domain based on a cumulative interference effect.

In embodiment 2302 of determining a protection domain based on a single interference effect, the generation apparatus may use static protection domain embodiment 2304 or dynamic protection domain embodiment 2305. A static protection domain may be a protection domain determined based on a result of comparison between a single interference effect and a threshold irrespective of an operating situation (e.g., whether being located indoors or outdoors, a service domain, etc.) of a new radio station. A dynamic protection domain may be a protection domain determined based on a result of comparison between a single interference effect and a threshold based on an operating situation (e.g., whether being located indoors or outdoors, a service domain, etc.) of a new radio station.

In static protection domain embodiment 2304, the generation apparatus may use 2D protection domain embodiment 2306 or 3D protection domain embodiment 2307. 2D protection domain embodiment 2306 may be an embodiment of determining a protection domain according to an interference effect calculated irrespective of a height of the new radio station. 3D protection domain embodiment 2307 may be an embodiment of determining a protection domain according to an interference effect calculated based on the height of the new radio station.

In static protection domain embodiment 2304, the generation apparatus may use 2D and 3D protection domain embodiment 2308. In 2D and 3D protection domain embodiment 2308, the generation apparatus may determine a protection domain based on the operating situation and the height of the new radio station.

In embodiment 2302 of determining a protection domain based on a cumulative interference effect, the generation apparatus may use embodiment 2309 of calculating a protection domain by correcting a protection domain determined based on a single interference effect or embodiment 2310 of determining a protection domain based on a cumulative interference effect.

In embodiment 2309 of calculating a protection domain by correcting a protection domain determined based on a single interference effect, the generation apparatus may use static, dynamic, 2D, and 3D protection domain embodiment 2311. In static, dynamic, 2D, and 3D protection domain embodiment 2311, the generation apparatus may consider a reception mask and a center frequency of the existing radio station, and transmission power, a transmission mask, whether being located indoors or outdoors, a height, a location, a center frequency, and a bandwidth of the new radio station when determining the cumulative interference effect.

In embodiment 2310 of determining a protection domain based on a cumulative interference effect, the generation apparatus may use static, dynamic, 2D, and 3D protection domain embodiment 2312. In static, dynamic, 2D, and 3D protection domain embodiment 2312, the generation apparatus may consider a reception mask and a center frequency of the existing radio station, and transmission power, a transmission mask, whether being located indoors or outdoors, a height, a location, a center frequency, and a bandwidth of the new radio station when determining the cumulative interference effect.

Figure 24:
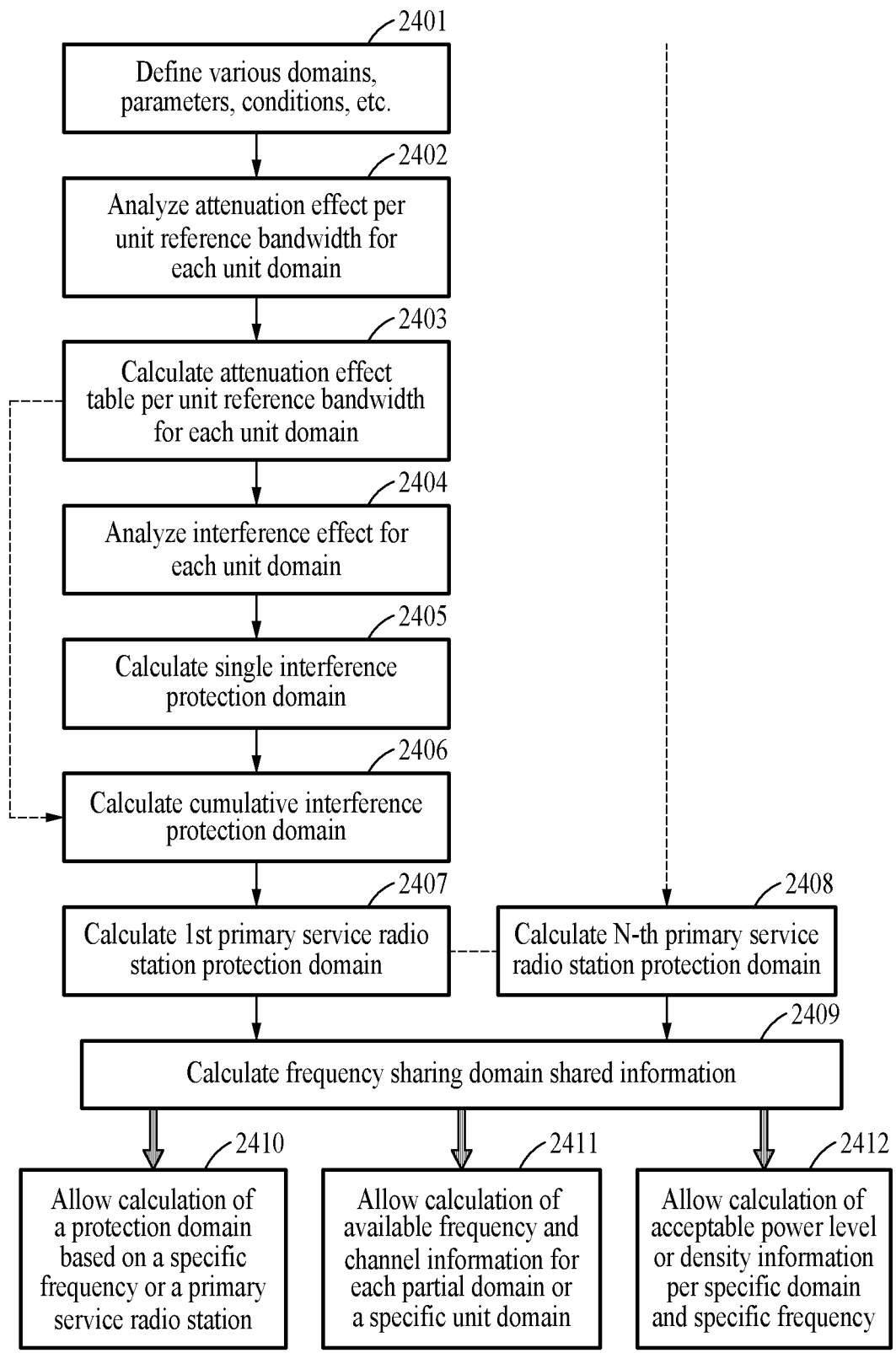
FIG. 24 is a flowchart illustrating a method of generating shared information according to an example embodiment.

FIG. 24 is a flowchart illustrating a method of generating shared information according to an example embodiment.

In operation 2401 of defining various domains, parameters, conditions, and the like, a generation apparatus may set an analysis domain based on an existing radio station, determine conditions such as an output level, an antenna height, an antenna pattern, an antenna gain, and an antenna oriented direction of a new radio station in advance, and receive parameters such as a reception mask and a center frequency of the existing radio station, and a transmission mask, a bandwidth, a center frequency, and transmission power of new radio stations.

In operation 2402 of analyzing an attenuation effect per unit reference bandwidth for each unit domain, the generation apparatus may determine an attenuation effect per unit reference bandwidth due to a reception mask of the existing radio station. The generation apparatus may determine the attenuation effect per unit reference bandwidth for each unit domain.

In operation 2403 of calculating an attenuation effect table per unit reference bandwidth for each unit domain, the generation apparatus may generate an attenuation effect table based on the attenuation effect per unit reference bandwidth. The attenuation effect table may define an attenuation effect according to a center frequency and a bandwidth.

In operation 2404 of analyzing an interference effect for each unit domain, the generation apparatus may calculate a single interference effect for each unit domain. The generation apparatus may determine the single interference effect based on transmission power of the new radio station, a path loss, and the attenuation effect.

When the attenuation effect per unit reference bandwidth is determined, the generation apparatus may determine the single interference effect based on a power density indicating a power intensity per unit reference bandwidth.

In operation 2405 of calculating a single interference protection domain, the generation apparatus may determine a protection domain based on the single interference effect. The generation apparatus may compare the single interference effect to a threshold. When a single interference effect of a unit domain is greater than a threshold, the generation apparatus may determine the unit domain to be a protection domain.

When calculating the single interference effect, the generation apparatus may determine the single interference effect to be in three dimensions based on a height of the new radio station. The generation apparatus may correct the determined protection domain based on the single interference effect determined as being in three dimensions. The generation apparatus may generate a separate protection domain for each frequency of a primary service that requires protection and generate a protection domain by integrating protection domains determined based on frequencies.

In operation 2406 of calculating a cumulative interference protection domain, the generation apparatus may calculate a cumulative interference effect by new radio stations included in the analysis domain and change the protection domain based on the cumulative interference effect. In operation 2407 of calculating a $1^{st}$ primary service radio station protection domain, the generation apparatus may determine a protection domain for the existing radio station.

In operation 2408 of calculating an N-th primary service radio station protection domain, the generation apparatus may determine a new protection domain based on another existing radio station. In operation 2409 of calculating frequency sharing domain shared information, the generation apparatus may determine shared information to be used by the new radio station to protect the primary service of existing radio stations.

In operation 2410 of allowing calculation of a protection domain based on a specific frequency or a primary service radio station, the generation apparatus may determine a protection domain for protecting a specific frequency of the primary service based on the shared information. The new radio station may be restricted on communication using a specific frequency in the protection domain for protecting the specific frequency of the primary service.

In operation 2411 of allowing calculation of available frequency and channel information for each partial domain or a specific unit domain, the generation apparatus may determine a frequency and a channel available to the new radio station in the specific unit domain of the primary service based on the shared information. The generation apparatus may use the frequency and the channel available to the new radio station in a unit domain based on the protection domain determined in consideration of reception masks of various existing radio stations for each unit domain.

In operation 2412 of allowing calculation of acceptable power level or density information per specific domain and specific frequency, the generation apparatus may determine a power level and a power density to be used by the new radio station for each specific frequency based on the shared information. The power level may refer to an output level of transmission power in a unit reference bandwidth of the new radio station. The power density may be determined to correspond to the power level. When the generation apparatus determines the cumulative interference effect, the transmission power of the new radio station may be taken into consideration. Thus, the generation apparatus may determine a power level and a power density available to the new radio station in accordance with a protection domain.

Figure 25:
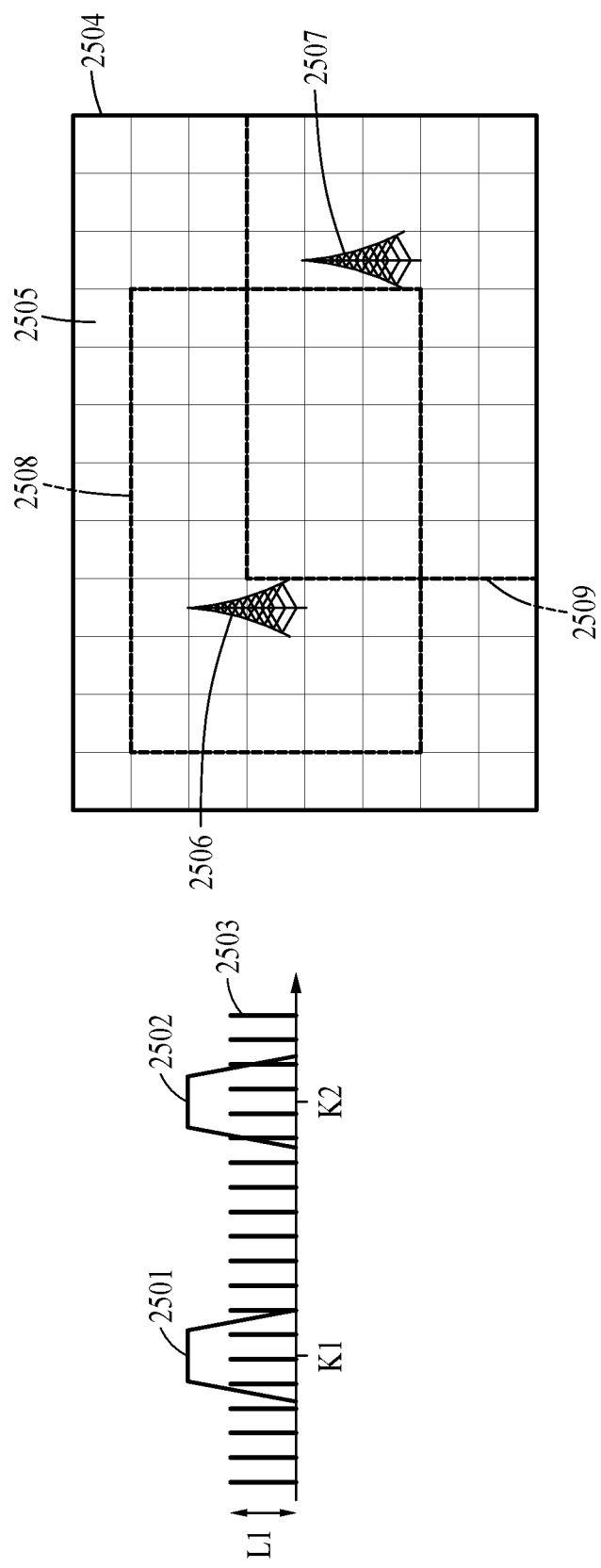
FIG. 25 is a diagram illustrating an example of a transmission mask, an analysis domain, and a protection domain of an existing radio station according to an example embodiment.

FIG. 25 is a diagram illustrating an example of a transmission mask, an analysis domain, and a protection domain of an existing radio station according to an example embodiment.

(a) of FIG. 25 shows a reception mask 2501 of an existing radio station 2506, a reception mask 2502 of an existing radio station 2507, and a bandwidth of a new radio station. (b) of FIG. 25 shows an analysis domain 2508 of the existing radio station 2506 and an analysis domain 2509 of the existing radio station 2507. The analysis domains 2508 and 2509 may include unit domains 2505 of an entire domain 2504 sharing a frequency.

FIGS. 26A-26E are diagrams illustrating examples of a table showing an attenuation effect and an interference effect according to an example embodiment.

FIG. 26A shows a transmission power density 2602 of a new radio station for each unit reference bandwidth. FIG. 26B shows an example in which the transmission power density 2602 of the new radio station is attenuated due to a reception mask 2601 of an existing radio station.

FIG. 26C shows an example of an attenuation effect table based on a unit domain and a frequency. A generation apparatus may generate an attenuation effect table by calculating an attenuation effect per unit reference bandwidth based on a frequency for each unit domain.

Figures 26D, 26E:
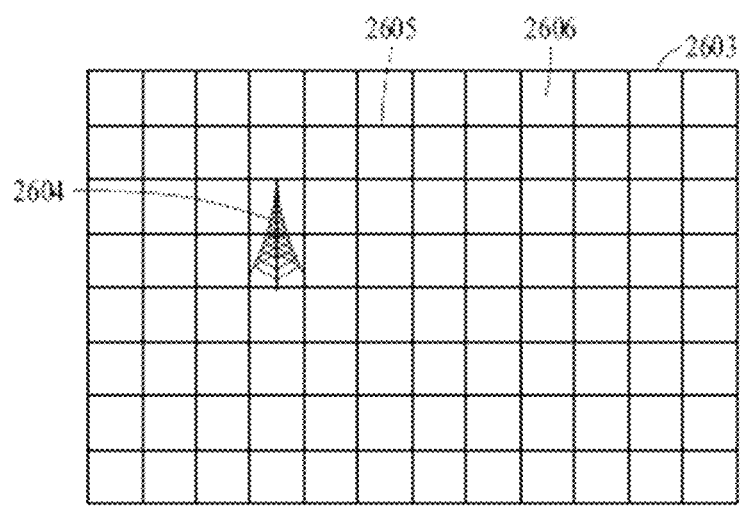

FIG. 26D is an interference effect table showing an interference effect determined for each unit domain. FIG. 26E shows an analysis domain 2605 of an existing radio station 2604. The analysis domain 2605 may include unit domains 2606 of an entire domain 2603 sharing a frequency.

FIGS. 27A-27D are diagrams illustrating examples of correcting a protection domain of an existing radio station according to an example embodiment.

Figure 27A:
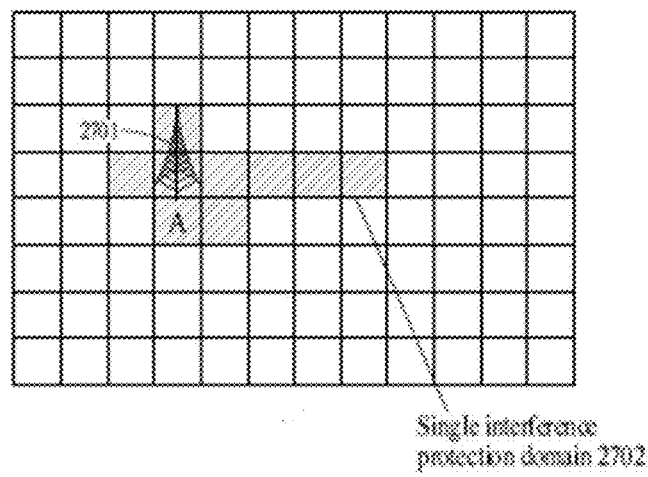
FIGS. 27A-27D are diagrams illustrating examples of correcting a protection domain of an existing radio station according to an example embodiment.
Figure 27B:
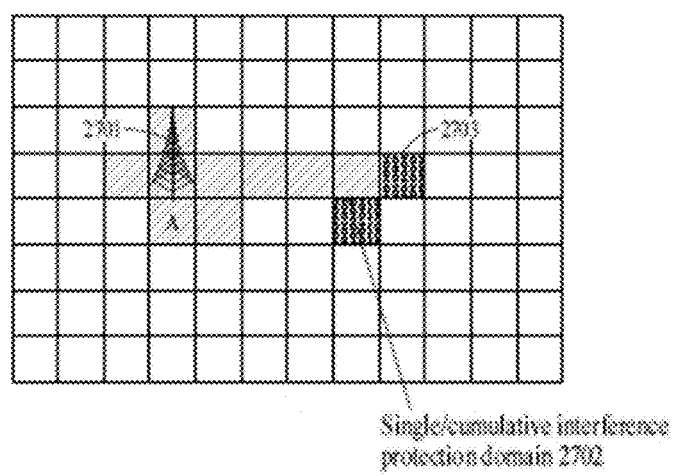

FIG. 27A shows an example of a protection domain 2702 of an existing radio station 2701 determined based on a single interference effect. FIG. 27B shows a partial protection domain 2703 added according to a cumulative interference effect or an operating situation of a new radio station.

Figure 27C:
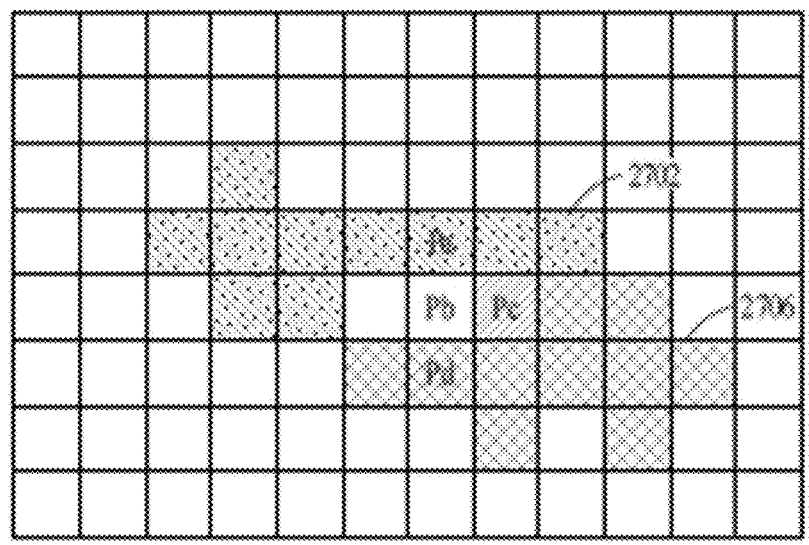
Figure 27D:
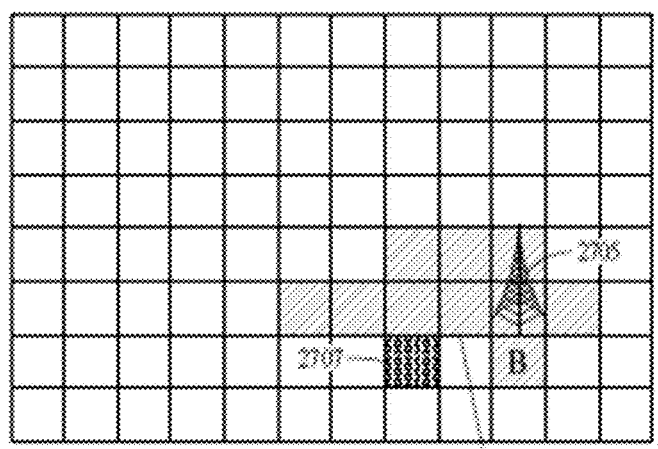

FIG. 27D shows that a protection domain 2706 of an existing radio station 2705 is determined based on a single interference effect and a partial protection domain 2707 is added due to a cumulative interference effect.

FIG. 27C shows a result of combining the protection domain 2702 and 2706 of the existing radio stations 2701 and 2705. In a domain Pa of FIG. 27, a new radio station may be restricted from using a frequency corresponding to K, K being a center frequency of the existing radio station 2701. If a center frequency of the existing radio station 2705 is M, in a domain Pd of FIG. 27, a new radio station may be restricted from using a frequency corresponding to M.

If the center frequency of the existing radio station 2701 is K and the center frequency of the existing radio station 2705 is M, the new radio station may be restricted from using frequencies corresponding to K and M in a domain Pc of FIG. 27 and may use the frequencies corresponding to K and M in a domain Pb.

FIG. 28A-28D are diagrams illustrating examples of determining a bandwidth of a channel or a frequency to be used by a new radio station in a unit domain or determining a power level according to an example embodiment.

Figure 28A:
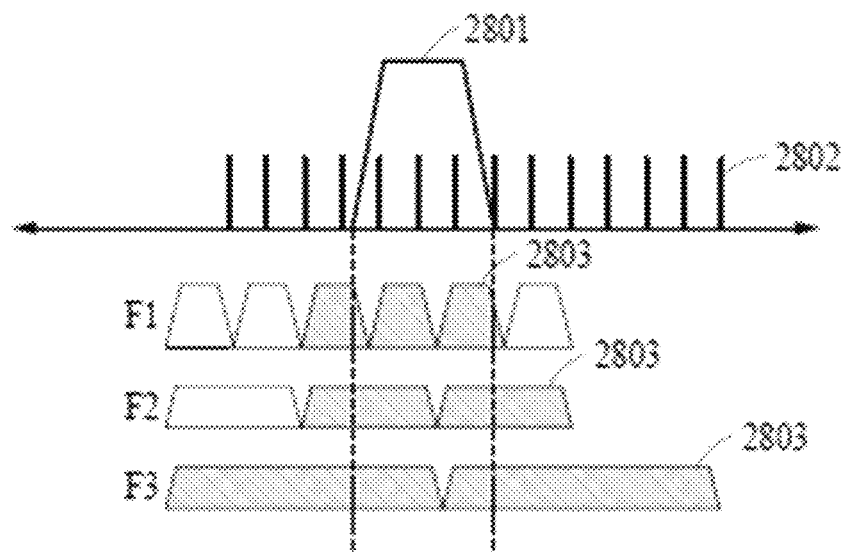
FIGS. 28A-28D are diagrams illustrating examples of determining bandwidth of a channel or a frequency to be used by a new radio station in a unit domain or determining a power level according to an example embodiment.
Figure 28B:
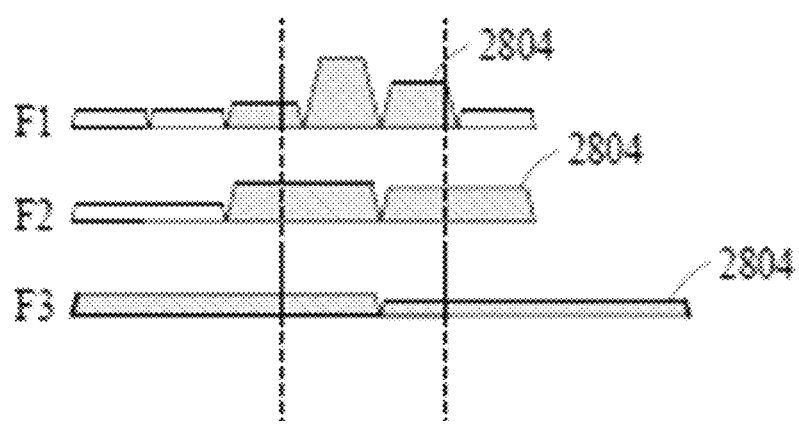

FIG. 28A shows a reception mask 2801 for primary service reception of an existing radio station, a unit reference bandwidth 2802, and bandwidths 2803 of different channels F1, F2, and F3 in which a new radio station operates. FIG. 28B shows a level of an interference effect determined according to an attenuation effect. An attenuated bandwidth 2804 of the new radio station may cause interference in the primary service reception of the existing radio station.

Figure 28C:
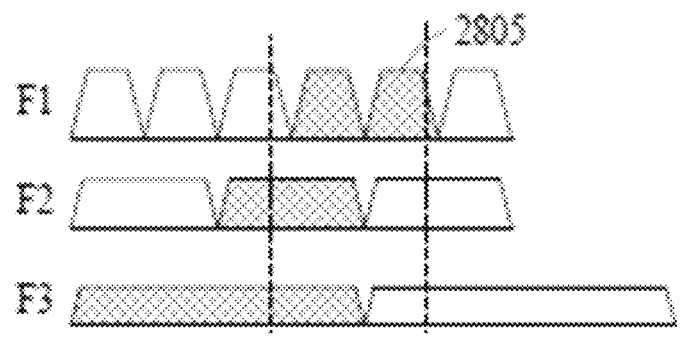
Figure 28D:
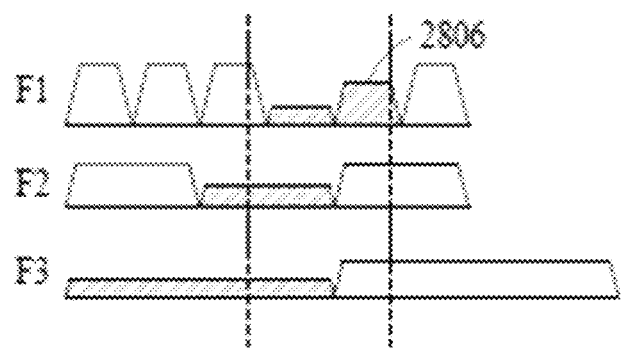

FIG. 28C shows a channel 2805 that is unavailable to the new radio station to protect a primary service. FIG. 28D shows an example of adjusting a transmission power level of the new radio station based on the unavailable channel 2805. A generation apparatus may determine a transmission power density for a bandwidth based on the unavailable channel 2805. For example, even if a specific channel is unavailable by a protection domain, the new radio station may use the channel by adjusting the transmission power, an output level, and the transmission power density.

Figure 29:
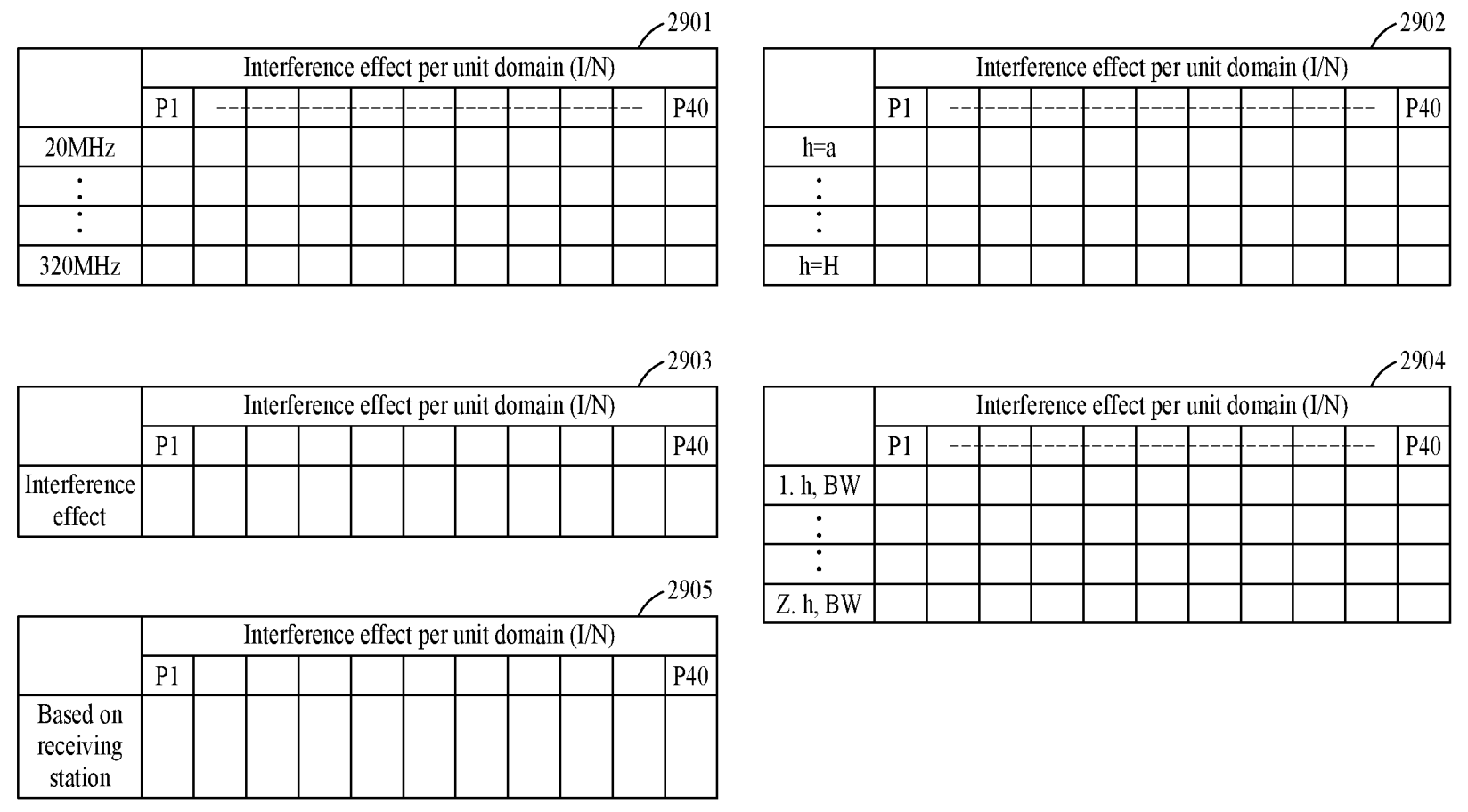

FIG. 29 is a diagram illustrating an example of a table of interference effects per unit domain determined based on different parameters according to an example embodiment.

An interference effect table 2901 may include a value of a single interference effect according to a bandwidth of a channel of a new radio station for each unit domain. An interference effect table 2902 may include a value of a single interference effect according to a height of a new radio station for each unit domain.

An interference effect table 2903 may include a value of a single interference effect of a new radio station for each unit domain. An interference effect table 2904 may include a value of a single interference effect with time for each unit domain. An interference effect table 2905 may include a value of a single interference effect based on a different existing radio station for each unit domain.

The method according to example embodiments may be embodied as a program that is executable by a computer and may be implemented as various recording media such as a magnetic storage medium, an optical reading medium, and a digital storage medium.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

Various techniques described herein may be implemented in digital electronic circuitry, or in computer hardware, firmware, software, or in combinations thereof. The techniques may be implemented as a computer program product, i.e., a computer program tangibly embodied in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or on multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as a compact disk read-only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include all computer storage media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above-described example embodiments in all example embodiments, and it should be understood that the above-described program components and apparatuses may be incorporated into a single software product or may be packaged in multiple software products.

It should be understood that example embodiments disclosed herein are merely illustrative and are not intended to limit the scope of the disclosure. It will be apparent to those skilled in the art that various modifications of the example embodiments may be made without departing from the spirit and scope of the claims and their equivalents.

What is claimed is:

1. A method of generating shared information, the method comprising:
   determining an attenuation effect on transmission power of a new radio station due to a reception mask of an existing radio station;
   calculating an interference effect of the existing radio station due to the new radio station using the attenuation effect;
   determining a protection domain of the existing radio station according to the interference effect; and
   generating shared information to be used by the new radio station based on the protection domain,
   wherein the protection domain is a domain in which a frequency available to the new radio station is restricted.

2. The method of claim 1, wherein the determining of the attenuation effect comprises determining an attenuation effect based on at least one of the reception mask of the existing radio station, a transmission mask of the new radio station, a difference between a center frequency of the new radio station and a center frequency of the existing radio station, a bandwidth of the new radio station, and the transmission power of the new radio station.

3. The method of claim 1, wherein the determining of the attenuation effect comprises determining the attenuation effect by calculating a total attenuation effect per unit reference bandwidth for each frequency.

4. The method of claim 1, wherein the calculating of the interference effect comprises determining the interference effect based on i) a difference between the transmission power of the new radio station and the attenuation effect and ii) a path loss interference effect according to a distance between a location of the new radio station and the existing radio station.

5. The method of claim 1, wherein when the new radio station is a plurality of new radio stations, the calculating of the interference effect comprises calculating a total interference effect for each of the new radio stations.

6. The method of claim 1, wherein the calculating of the interference effect comprises determining the interference effect for each unit domain using the attenuation effect, and
   the protection domain comprises unit domains in which the interference effect is higher than a threshold.

7. The method of claim 6, wherein the calculating of the interference effect comprises determining an interference effect on the unit domain using one of whether the new radio station is indoor or outdoor, a service domain of the new radio station, and a height of the new radio station.

8. The method of claim 6, wherein the determining of the protection domain comprises correcting the determined protection domain based on interference effects of the new radio station and other new radio stations.

9. The method of claim 1, wherein the shared information comprises one of a frequency, a channel, transmission power, and a transmission power density of the new radio station, which are not to cause an interference effect greater than or equal to a threshold to the existing radio station.

10. A generation apparatus performing a method of generating shared information, the generation apparatus comprises:
    a processor,
    wherein the processor is configured to determine an attenuation effect on transmission power of a new radio station due to a reception mask of an existing radio station, calculate an interference effect of the existing radio station due to the new radio station using the attenuation effect, determine a protection domain of the existing radio station according to the interference effect, and generate shared information to be used by the new radio station based on the protection domain, and
    the protection domain is a domain in which a frequency available to the new radio station is restricted.

11. The generation apparatus of claim 10, wherein the processor is configured to determine an attenuation effect based on at least one of the reception mask of the existing radio station, a transmission mask of the new radio station, a difference between a center frequency of the new radio station and a center frequency of the existing radio station, a bandwidth of the new radio station, and the transmission power of the new radio station.

12. The generation apparatus of claim 10, wherein the processor is configured to determine the attenuation effect by calculating a total attenuation effect per unit reference bandwidth for each frequency.

13. The generation apparatus of claim 10, wherein the processor is configured to determine the interference effect based on i) a difference between the transmission power of the new radio station and the attenuation effect and ii) a path loss interference effect according to a distance between a location of the new radio station and the existing radio station.

14. The generation apparatus of claim 10, wherein when the new radio station is a plurality of new radio stations, the processor is configured to calculate a total interference effect for each of the new radio stations.

15. The generation apparatus of claim 10, wherein the processor is configured to determine the interference effect for each unit domain using the attenuation effect, and
the protection domain comprises unit domains in which the interference effect is higher than a threshold.

* * * * *